(12) United States Patent
Stevens et al.

(10) Patent No.: US 7,953,820 B2
(45) Date of Patent: May 31, 2011

(54) METHOD AND SYSTEM FOR PROVIDING ENHANCED PERFORMANCE OF WEB BROWSING

(75) Inventors: Patrick Stevens, Eldersburg, MD (US); Daniel Friedman, Silver Spring, MD (US); Robert Torres, New Market, MD (US); Vaibhav Kumar, Germantown, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 1937 days.

(21) Appl. No.: 10/659,486

(22) Filed: Sep. 10, 2003

(65) Prior Publication Data

US 2005/0044242 A1 Feb. 24, 2005

Related U.S. Application Data

(60) Provisional application No. 60/409,737, filed on Sep. 11, 2002.

(51) Int. Cl.
*G06F 15/16* (2006.01)
(52) U.S. Cl. .................. 709/219; 709/226; 709/246
(58) Field of Classification Search .......... 709/203, 709/217, 219, 226, 246
See application file for complete search history.

(56) References Cited

U.S. PATENT DOCUMENTS

| 6,947,440 | B2* | 9/2005 | Chatterjee et al. ............ 370/429 |
|---|---|---|---|
| 7,000,189 | B2* | 2/2006 | Dutta et al. ................... 715/727 |
| 2002/0120782 | A1 | 8/2002 | Dillon et al. |
| 2003/0093463 | A1* | 5/2003 | Graf ............................... 709/203 |
| 2003/0125953 | A1* | 7/2003 | Sharma ......................... 704/270 |
| 2004/0170155 | A1* | 9/2004 | Omar et al. ................... 370/349 |

FOREIGN PATENT DOCUMENTS

| WO | WO 99/08429 | 2/1999 |
|---|---|---|
| WO | WO 01/63420 | 8/2001 |

OTHER PUBLICATIONS

XP-002262499, "Performance Enhancing Proxies Intended to Mitigate Link-Related Degradations", J. Border et al., pp. 1-45.

* cited by examiner

*Primary Examiner* — Ario Etienne
*Assistant Examiner* — El Hadji Sall

(57) ABSTRACT

An approach is provided for supporting retrieval of web content over a meshed communication network (111). A first server (105) receives a request from a browser application (103) for the content resident in the web server (109). The first server (105) includes a downstream proxy (401) configured to modify the request to include information specifying support of a parse and pre-fetch service within an optional header field of the request as to permit handling of the modified request by the web server (109) in absence of an upstream proxy (403) that is communicating with the web server (109). A second server (107) is configured as the upstream proxy (403) to intercept the modified request and pre-fetch the content from the web server (109). The second server (107) forwards the pre-fetched content over the communication network (111) to the first server (105). This approach has particular applicability in relatively high latency networks, such as a satellite communications system.

31 Claims, 10 Drawing Sheets

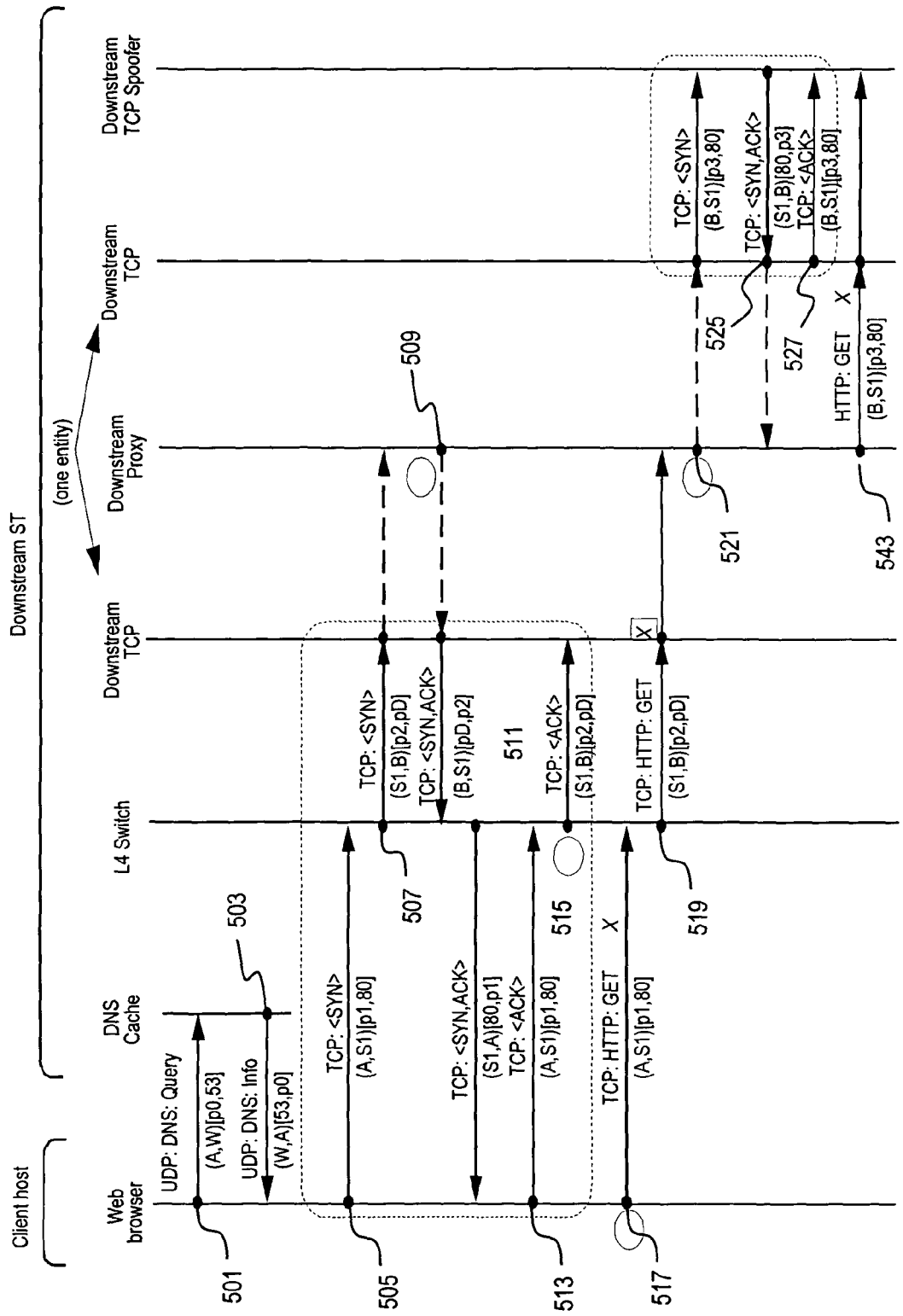

METHOD AND SYSTEM FOR PROVIDING ENHANCED PERFORMANCE OF WEB BROWSING

RELATED APPLICATIONS

This application is related to, and claims the benefit of the earlier filing date under 35 U.S.C. §119(e) of, U.S. Provisional Patent Application (Ser. No. 60/409,737) filed Sep. 11, 2002, entitled "System and Method for Pre-fetching Content in a Proxy Architecture"; the entirety of which is incorporated herein by reference.

FIELD OF THE INVENTION

The present invention relates generally to a communications system, and is more particularly related to improving performance of web browsing.

BACKGROUND OF THE INVENTION

The maturity of electronic commerce and acceptance of the Internet as a daily tool by a continually growing user base of millions of users intensify the need for communication engineers to develop techniques for enhancing network performance. With the advances in processing power of desktop computers, the average user has grown accustomed to sophisticated multimedia applications, which place tremendous strain on network resources (e.g., switch capacity). Also, processor performance has advanced to the degree that, for applications running across networks, network delays compose the largest portion of application response times. At the same time, users have grown less tolerant of network delays, demanding comparable improvements from the network infrastructure. Therefore, network performance enhancing mechanisms are needed to optimize efficiency and reduce user response times. These mechanisms are imperative in systems with relatively high network latency, such as a satellite network.

FIG. 8 is a diagram of a conventional communication system for providing retrieval of web content by a personal computer (PC). PC 801 is loaded with a web browser 803 to access the web pages that are resident on web server 805; collectively the web pages and web server 805 denote a "web site." PC 803 connects to a wide area network (WAN) 807, which is linked to the Internet 809. The above arrangement is typical of a business environment, whereby the PC 801 is networked to the Internet 809. A residential user, in contrast, normally has a dial-up connection (not shown) to the Internet 809 for access to the Web. The phenomenal growth of the Web is attributable to the ease and standardized manner of "creating" a web page, which can possess textual, audio, and video content.

Web pages are formatted according to the Hypertext Markup Language (HTML) standard which provides for the display of high-quality text (including control over the location, size, color and font for the text), the display of graphics within the page and the "linking" from one page to another, possibly stored on a different web server. Each HTML document, graphic image, video clip or other individual piece of content is identified, that is, addressed, by an Internet address, referred to as a Uniform Resource Locator (URL). As used herein, a "URL" may refer to an address of an individual piece of web content (HTML document, image, sound-clip, video-clip, etc.) or the individual piece of content addressed by the URL. When a distinction is required, the term "URL address" refers to the URL itself while the terms "web content", "URL content" or "URL object" refers to the content addressed by the URL.

In a typical transaction, the user enters or specifies a URL to the web browser 803, which in turn requests a URL from the web server 805 using the HyperText Transfer Protocol (HTTP). The web server 805 returns an HTML page, which contains references to numerous embedded objects (i.e., web content), to the web browser 803. Upon receiving the HTML page, the web browser 803 parses the page to retrieve each embedded object. The retrieval process typically requires the establishment of separate communication sessions (e.g., TCP (Transmission Control Protocol) connections) to the web server 805. That is, after an embedded object is received, the TCP connection is torn down and another TCP connection is established for the next object. Given the richness of the content of web pages, it is not uncommon for a web page to possess over 30 embedded objects. This arrangement disadvantageously consumes network resources, but more significantly, introduces delay to the user.

Delay is further increased if the WAN 807 is a satellite network, as the network latency of the satellite network is conventionally a longer latency than terrestrial networks. In addition, because HTTP commonly utilizes a separate TCP connection for each transaction, the large number of transactions amplifies the response time perceived by the end-user.

Based on the foregoing, there is a clear need for improved approaches for retrieval of web content within a communication system. There is also a need to utilize standard protocols to minimize development costs, interoperate with existing web browsers and servers, and provide rapid industry acceptance. There is a further need for a web content retrieval mechanism that makes networks with relatively large latency viable and/or competitive for Internet access. Therefore, an approach for retrieving web content that reduces response times perceived by users is highly desirable.

SUMMARY OF THE INVENTION

The present invention addresses the above stated needs by providing a transparent parsing and pre-fetching service to efficiently retrieve web content over a high latency communication system. A browser application initiates a request for content (e.g., HTML page) towards the web server hosting the content. A downstream proxy, which can be resident on a satellite terminal (ST), communicates with the web browser (or other client applications) according to a HyperText Transfer Protocol (HTTP). The downstream proxy, in an exemplary embodiment, inserts "optional" fields in the HTTP request header to designate that the parse and pre-fetch service is enabled. An upstream proxy, if present, intercepts the request, fetches the HTML from the web server based on the request, and parses the retrieved HTML, and pre-fetches the objects specified by the HTML from the web server. The downstream proxy operates independently and transparently with respect to the upstream proxy. In one embodiment, the downstream proxy can operate with multiple upstream proxies, to different routes, simultaneously, without hierarchical arrangement of these upstream proxies. The downstream proxy can obtain pre-fetched content (as well as DNS information) provided by upstream proxies without the need for prior connection setup specific to the parse and pre-fetched service. According to one embodiment of the present invention, the downstream and upstream proxies are located within the same routing device (e.g., ST) to support independent parse and pre-fetch transactions in different directions; under this scenario, these proxies can be simultaneously served by a Layer 4 switch.

The above arrangement advantageously reduces response time, while conserving system bandwidth.

According to one aspect of an embodiment of the present invention, a method for retrieving content over a communication network from a web server is disclosed. The method includes receiving a request from a browser application for the content in the web server. The method also includes modifying the request to include information specifying support of a parse and pre-fetch service as to permit handling of the modified request by the web server in absence of an upstream proxy that is communicating with the web server. Additionally, the method includes forwarding the modified request towards the web server, wherein the upstream proxy, if present, intercepts the modified request and pre-fetches the content from the web server. Further, the method includes selectively receiving the content from the upstream proxy over the communication network and forwarding the content to the browser application.

According to another aspect of the invention, a network apparatus for supporting retrieval of content over a communication network from a web server is disclosed. The apparatus includes an interface configured to receive a request from a browser application for the content in the web server. The apparatus also includes a proxy being downstream with respect to the web server and configured to modify the request to include information specifying support of a parse and pre-fetch service as to permit handling of the modified request by the web server in absence of an upstream proxy that is communicating with the web server. The modified request is forwarded towards the web server, and the remote upstream proxy, if present, intercepts the modified request and pre-fetches the content from the web server, the content from the upstream proxy being received over the communication network and being forwarded to the browser application.

According to another aspect of the invention, a method for retrieving content over a communication network from a web server is disclosed. The method includes intercepting a request initiated by a browser application for the content, the request being forwarded by a proxy downstream with respect to the web server, wherein the request includes information identifying the downstream proxy. The method also includes pre-fetching the content from the web server based on the request. Further, the method includes forwarding the pre-fetched content to the downstream proxy over the communication network, the downstream proxy forwarding the content to the browser application.

According to another aspect of the invention, a network apparatus for retrieving content over a communication network from a web server is disclosed. The network apparatus includes an interface configured to intercept a request initiated by a browser application for the content. The request is forwarded by a proxy downstream with respect to the web server, wherein the request includes information identifying the downstream proxy. The method also includes an upstream proxy configured to pre-fetch the content from the web server based on the request. The pre-fetched content is forwarded to the downstream proxy over the communication network, the downstream proxy forwarding the content to the browser application.

In another aspect of the invention, a system for supporting retrieval of content over a meshed communication network is disclosed. The system includes a first server configured to receive a request from a browser application for the content resident in the web server. The first server includes a downstream proxy configured to modify the request to include information specifying support of a parse and pre-fetch service within an optional header field of the request as to permit handling of the modified request by the web server in absence of an upstream proxy that is communicating with the web server. The system includes a second server configured as the upstream proxy to intercept the modified request and pre-fetch the content from the web server. The second server forwards the pre-fetched content over the communication network to the first server.

In yet another aspect of the invention, a network device for retrieving content over a communication network from a web server is disclosed. The device includes means for receiving a request from a browser application for the content in the web server; and means for modifying the request to include information specifying support of a parse and pre-fetch service as to permit handling of the modified request by the web server in absence of an upstream proxy that is communicating with the web server. The device also includes means for forwarding the modified request towards the web server, wherein the upstream proxy, if present, intercepts the modified request and pre-fetches the content from the web server. Further, the device includes means for selectively receiving the content from the upstream proxy over the communication network and forwarding the content to the browser application.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 5A and 5B are a ladder diagram of communications from a downstream satellite terminal (ST) to an upstream ST in support of a parse and pre-fetch process, according to an embodiment of the present invention;

DESCRIPTION OF THE PREFERRED EMBODIMENT

A system, method, and software for supporting a transparent parse and pre-fetch proxy service to retrieve web content are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Although the present invention is described with respect to a satellite network, it is recognized by one of ordinary skill in the art that the present invention has applicability to other wide area networks (WANs).

Figure 1:
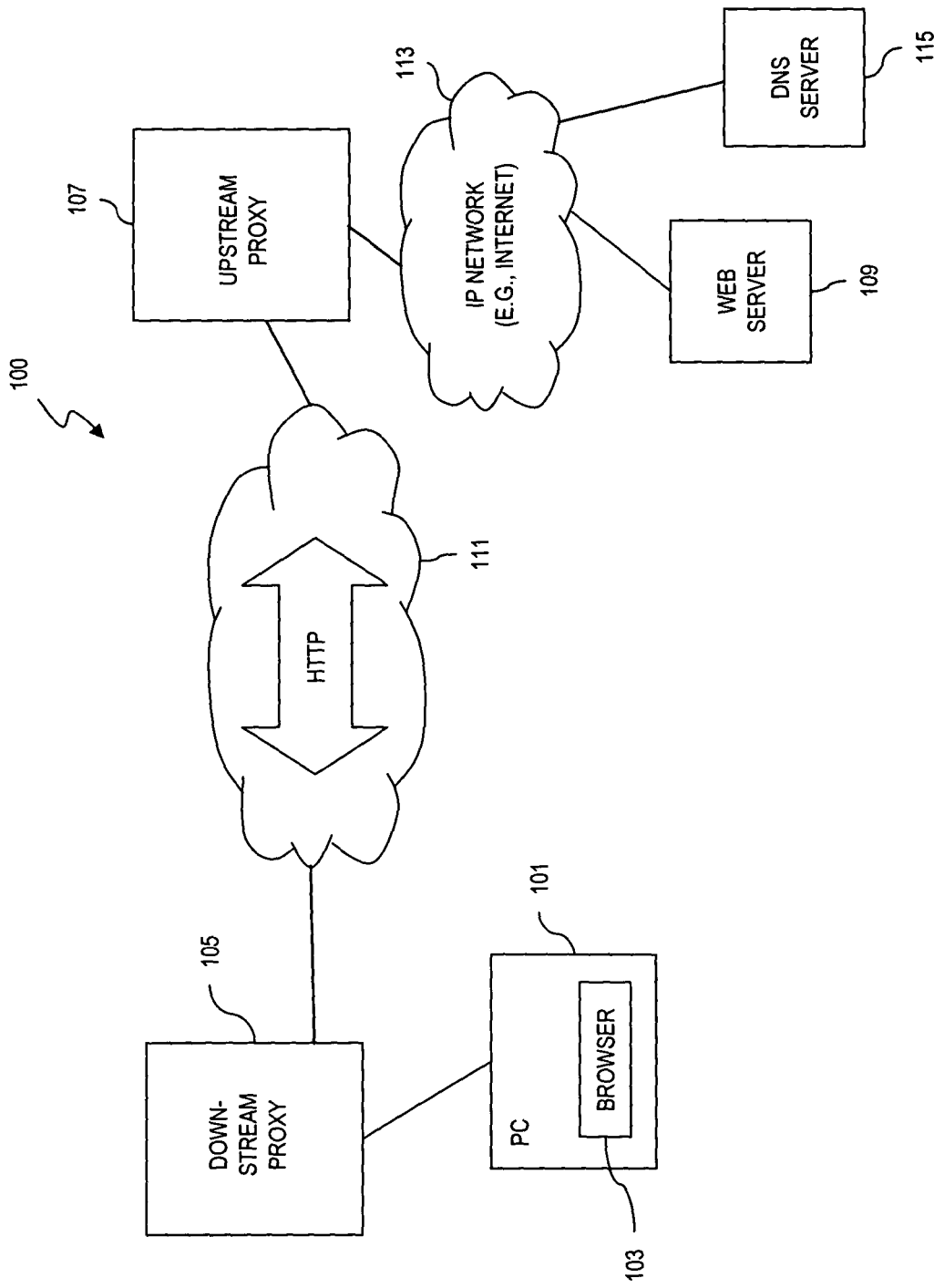
FIG. 1 is a diagram of a communications system capable of supporting a parse and pre-fetch process, according to an embodiment of the present invention.

FIG. 1 is a diagram of a communications system capable of supporting a parse and pre-fetch process, according to an embodiment of the present invention. A communication system 100 includes a user station 101 that utilizes a standard web browser 103 (e.g., Microsoft® Internet Explorer, Netscape® Navigator). In this example, the user station 101 is a personal computer (PC); however, any computing platform may be utilized, such as a workstation, web enabled set-top boxes, wireless Personal Digital Assistant (PDA), "webified" (i.e., web enabled) cell phone, web appliances, and etc. The phenomenal growth of the Web is attributable to the ease and standardized manner of "creating" a web page, which can possess textual, audio, image, video, and other content. Web pages are formatted according to the Hypertext Markup Language (HTML) standard which provides for the display of high-quality text (including control over the location, size, color and font for the text), the display of graphics within the page and the "linking" from one page to another, possibly stored on a different web server. Each HTML document, graphic image, video clip or other individual piece of content is identified, that is, addressed, by an Internet address, referred to as a Uniform Resource Locator (URL). As used herein, a "URL" may refer to an address of an individual piece of web content (HTML document, image, sound-clip, video-clip, etc.) or the individual piece of content addressed by the URL. When a distinction is required, the term "URL address" refers to the URL itself while the terms "web content", "URL content" or "URL object" refers to the content addressed by the URL.

The communication system 100, in an exemplary embodiment, utilizes two proxies 105, 107, which are referred to as a downstream proxy 105 and an upstream proxy 107, respectively to deploy the parse and pre-fetch service. The proxies 105, 107 operate transparently with the web browser 103; that is, the web browser 103 is unaware of the existence of the downstream proxy 105 and the upstream proxy 107, thereby increasing the usability of client software by eliminating the need to configure the browser 103 in order to achieve the response time and bandwidth reduction benefits of proxy the parse and pre-fetch capability. Conventionally, configuration of the browser in existing client software has been required. Accordingly, the web server 109 is also unaware of the existence of the downstream proxy 105 and the upstream proxy 107.

As used herein, the terms "upstream" and "downstream" refer to the flow of content from a content server (i.e., web server 109) to the client. According to one embodiment of the present invention, the terms comply with the definitions specified in the Internet Engineering Task Force (IETF) Request for Comment (RFC) 2616 (HTTP 1.1), the proxy closer (as defined from a network connectivity perspective, not necessarily geographically) to the web server 109 is termed the HTTP Parse and Pre-fetch (HPP) upstream proxy, while the proxy closer to the web browser 103 (on the other side of the network from the upstream proxy 107) is termed the downstream proxy. The proxies 105 and 107, according to an embodiment of the present invention, enhance the operation of the HyperText Transfer Protocol (HTTP), and accordingly, communicate using, in an exemplary embodiment, Transmission Control Protocol (TCP) connections, in which multiple TCP connections may be used to support parallel HTTP transactions. It is recognized that other transport protocols can be utilized to support HTTP. In addition, the servers 105 and 107 can communicate using persistent connections (e.g., as provided by HTTP 1.1). Use of persistent connections enables a single TCP connection to be reused for multiple requests of the embedded objects within a web page (as well as other content) associated with web server 109. Additionally, the TCP Transaction Multiplexing Protocol (TTMP) may be utilized to further enhance network efficiencies. HTTP is an application level protocol that is employed for information transfer over the Web. RFC (Request for Comment) 2616 specifies this protocol and is incorporated herein in its entirety. As will be described in more detail later, these proxy services (or functions) may also be resident entirely within the host 101 or within a router or satellite terminal (FIG. 4), or a combination thereof.

PC 101 connects to a downstream proxy 105, which communicates with an upstream proxy 107 through a wide area network (WAN) 111. According to an embodiment of the present invention, the WAN 111 is a VSAT (Very Small Aperture Terminal) satellite network. Alternatively, the network 111 may be any type of Wide Area Network (WAN); e.g., ATM (Asynchronous Transfer Mode) network, router-based network, T1 network, etc. The upstream server 107 has connectivity to an IP network 113, such as the Internet, to access web server 109.

The web browser 103 can access URLs either directly from a web server 109 or from proxies 105 and 107. A web page may refer to various source documents by indicating the associated URLs. As discussed above, a URL specifies an address of an "object" in the Internet 113 by explicitly indicating the method of accessing the resource. A representative format of a URL is as follows: http://www.hns.com/homepage/document.html. This example indicates that the file "document.html" is accessed using HTTP.

Upon receiving the HTML page, the web browser 103 parses the page to retrieve each embedded object. The retrieval process requires the establishment of separate communication sessions (e.g., TCP (Transmission Control Protocol) connections) to the web server 109. That is, after an embedded object is received, the TCP connection is torn down and another TCP session is established for the next object. Given the richness of the content of web pages, it is not uncommon for a web page to possess over 30 embedded objects; thereby consuming a substantial amount of network resources, but more significantly, introduces delay to the user. The establishment of the TCP connection takes one round trip traversal of the WAN 111 and then the requesting of the URL and receiving its response takes another round trip traversal. Delay is of a particular concern in the system 100 if the WAN 111, in an exemplary embodiment, is a satellite network, in that the network latency of the satellite network is conventionally longer than terrestrial networks.

To mitigate the delay introduced by the WAN 111, the upstream proxy 107, which is on the web server side of the WAN 111, parses the HTML page of the web server 109, identifies the objects embedded in the HTML page, and pre-fetches such objects from the web server 109. The upstream proxy 107 forwards the pre-fetched objects across the WAN 111 towards the web browser 103 to the counterpart downstream proxy 105 from which the web browser 103 can retrieve the objects without transmitting a message (e.g., GET message) across the WAN 111. This process of parsing and pre-fetching is described more fully below with respect to FIG. 3.

Further, the upstream proxy 107 can forward Domain Name Service (DNS) information obtained from a DNS server 115 to the downstream proxy 105. It is contemplated that other mechanisms The robustness of the global Internet 113 stems in part from the naming system that is in place for one machine to communicate with another machine. The naming system that has been adopted is known as the Domain Name System or Domain Name Service (DNS), which permits machines to be identified by "domain names" (i.e., host names), which provide a more readily usable address naming scheme for human recognition; for example, "hns.com". Applications, such as e-mail or web-browsing, utilize domain names in their communication with remote machines and other processes. This communication requires the translation or mapping of domain names to numeric addresses, such as Internet Protocol (IP) addresses, to reach specific machines. In essence, DNS provides a mapping of domain names to IP addresses. The DNS is a distributed database that stores the domain name, IP address, as well as other information about hosts. The distributed database is implemented by storing various portions of the database across multiple servers in a hierarchical structure—these servers are termed "DNS servers." Thus, the host associated with the application submits queries to a DNS server for a specific IP address of a particular destination machine. In this example, the browser 103 has to perform a DNS lookup to convert a URL's web server domain name into an IP address. That is, the user enters or specifies a URL to the web browser 103 of the host 101, which in turn requests a URL from the web server 109. The host 101 may need to resolve an Internet Protocol (IP) address corresponding to a domain name of the URL from the DNS server 115. Such a domain name lookup conventionally requires a traversal of the WAN 111 which introduces additional delay. The web server 109 returns an HTML page, which contains numerous embedded objects (i.e., web content), to the web browser 103.

It is contemplated that, architecturally, the system 100 can deploy the downstream proxy 105 without an upstream proxy. As more fully described later, the downstream proxy 105 need not have knowledge of the upstream proxy 107. Alternatively, the system 100 can implement one or more upstream proxies 107, at different connectivity points of the WAN 111.

Figure 2:
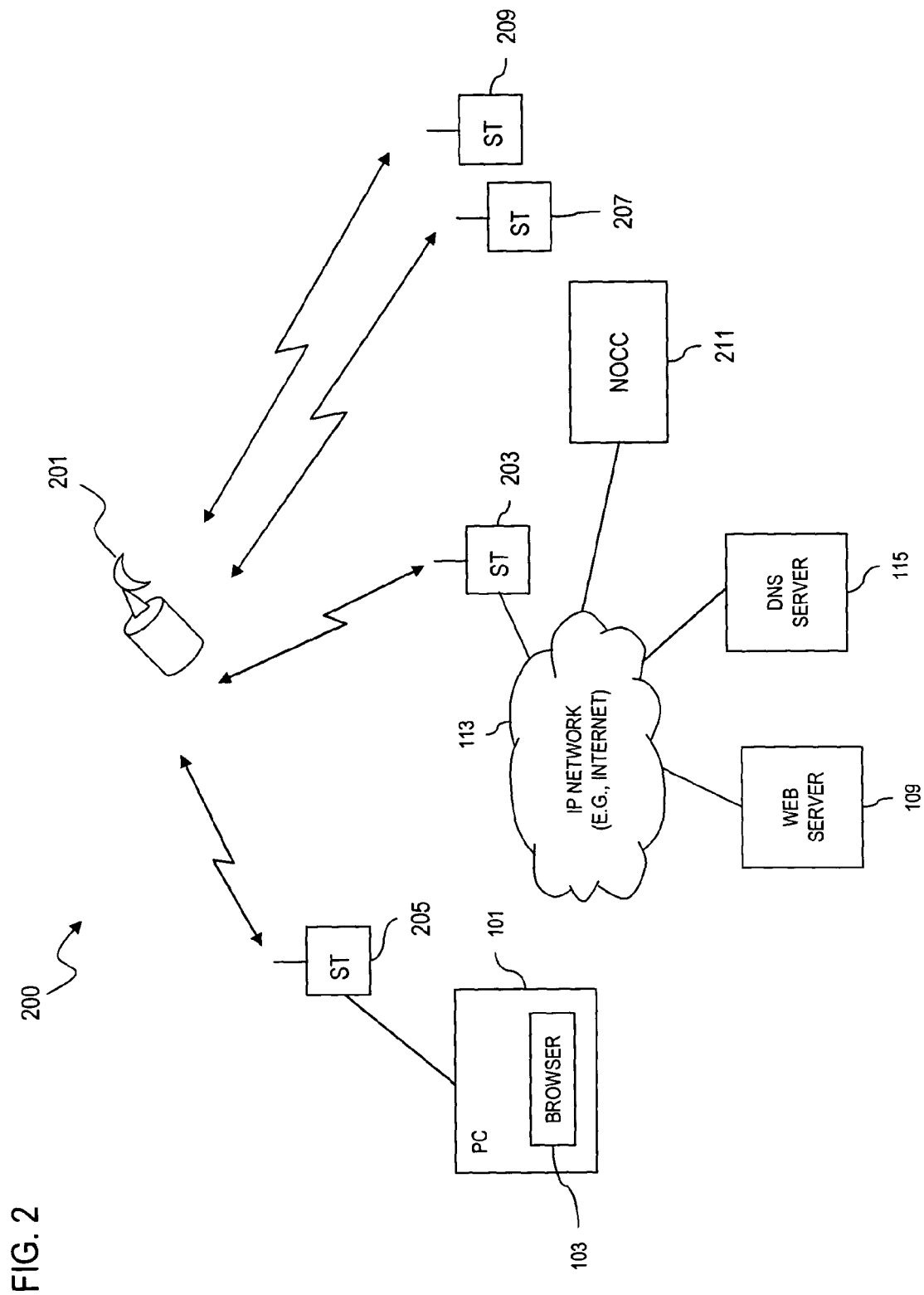
FIG. 2 is a diagram of a satellite communication system capable of supporting a parse and pre-fetch process, in accordance with an embodiment of the present invention.

FIG. 2 shows a diagram of a satellite communication system capable of supporting a parse and pre-fetch process, in accordance with an embodiment of the present invention. In particular, the system of FIG. 2 illustrates a specific implementation of the system of FIG. 1, in which the WAN 111 is a satellite system 200, which includes a satellite 201 that supports communication among satellite terminals (STs) 203, 205, 207, and 209. The system 200 employs a Network Operations Control Center (NOCC) 211 to manage and control communication services and operations. For example, the NOCC 211 provisions and identifies the channels that are to be allocated.

In an exemplary embodiment, the STs 203, 205, 207, and 209 are Very Small Aperture (VSAT) terminals. Under this architecture, users can communicate from one satellite terminal (ST) to another ST directly with one satellite hop. That is, the system 200 provides mesh connectivity. Satellite 201 contains a fast packet switch (FPS) (not shown) to process data packets that are exchanged across system 200. Exemplary switches include an ATM (Asynchronous Transfer Mode) switch, and a Gigabit Ethernet switch; it is recognized by one of ordinary skill in the art that any type of switch can be utilized. The FPS transfers the packets that the payload of the satellite 201 receives on the uplinks to the proper downlinks. The payloads of satellite 201 may include other components, such as uplink antenna, down-converters, switch matrix, demodulator banks, and phased-array downlink antenna; these other components are well known, and thus, are not described in detail.

The satellite 201 performs the necessary bandwidth control functions, in conjunction with the NOCC 211. In system 200, STs 203, 205, 207, and 209 originate traffic from a particular coverage area and may exchange data among the other STs. The generated traffic from these STs 203, 205, 207, and 209 is transferred through the FPS and terminates at destination STs (not shown) within the same and/or different coverage area. That is, the destination STs can be within the same coverage area as the originating STs. To effectively transmit traffic to the desired destination ST through the switch of the satellite 201, STs 203, 205, 207, and 209 transmit bandwidth requests to the satellite 201 prior to transmitting any data traffic.

A connection that is established between a source ST and a destination ST is controlled by the satellite 201 and the NOCC 211. The NOCC 211, which is based on the ground, provides management functions for the system 200. For example, an ST needs to obtain authorization from the NOCC 211 before making a request to the satellite 201. The NOCC 211 keeps track of the total uplink (and downlink) bandwidth available for connections and will block a connection request if there is insufficient satellite capacity available to satisfy the request.

The satellite 201 implements the bandwidth control function, which includes controlling the allocation of uplink channels and timeslots and mitigating downlink congestion. Satellite 201 examines the requested bandwidth and replies with grants based on downlink resource availability. In an exemplary embodiment, TDMA (Time Division Multiple Access)/FDMA (Frequency Division Multiple Access) uplink channels carry traffic that is regulated by request/grant bandwidth control processes.

For the purposes of explanation, the ST 205 serves as downstream ST, while the ST 203 is the upstream ST. The system 200 can operate under the following arrangements: Hub-and-Spoke; Multi-Source, and Full-Mesh. Under the Hub-and-Spoke architecture, web content is retrieved by the browser 103 via a single upstream ST, namely at the hub, such as the NOCC 211. In the multi-source architecture, web servers may be distributed behind several satellite routes (or STs); however, when the browser 103 at the downstream ST 205 requests a web page, all objects within that page are served behind a single satellite route (or ST). The DNS server 115 is assumed to be behind a single ST within the system 200. In the Full-Mesh architecture, objects of a web page may be served via multiple satellite routes.

In the Multi-Source scenario, not all web pages are served via a single ST; accordingly, the parse and pre-fetch operation provides support for satellite redirect, whereby the destination of the packet is altered for processing, as described below. Furthermore, the existence of an upstream proxy is not assured, since upstream STs may be configured differently.

If the Web browser 103 is configured in a "proxy mode," the proxy must be local to the browser 103 relative to the satellite link—for example, the downstream ST 205 (which possesses the downstream proxy) can serve as the proxy for the browser 103. It is noted that if the browser 103 were not configured for the "proxy mode," the parse and pre-fetch capability would not be invoked. In order for the downstream ST 205 to support browsers configured with proxy mode either enabled or disabled, the downstream ST 205 has to issue DNS Requests for the URL's of all HTTP GETs that it receives.

The downstream ST 205 need not address HTTP GET/TCP/IP packets to the upstream ST 203, but to the address of the Web server of interest (e.g., Web server 109). Because the satellite network 200 operates with mesh capability, the downstream ST 205 has no knowledge whether a given next hop ST with a HPP upstream proxy is the "best" next hop. The ST hosting the downstream proxy may be redirected (as described below in FIGS. 5A and 5B) to a different next hop ST; in some cases, the ST local to a web server 109 may not host a HPP upstream proxy. Accordingly, the HPP upstream proxy operates in "transparent mode," whereby the upstream proxy provides parse and pre-fetch operation to a downstream proxy that addresses its HTTP GET messages to the Web server of interest.

It is noted that the ST hosting either the upstream or downstream proxy can be configured such that route lookup of HTTP/TCP/IP packets takes place prior to processing the packet the ST's downstream proxy, thereby ensuring that HTTP packets destined to locally deployed Web servers are not inadvertently sent across the satellite interface. Although the above discussion describes the STs 203, 205 as executing the respective upstream proxy and downstream proxy, any of the STs 203, 205, 207, 209 can implement both proxies, and simultaneously.

Figure 3:
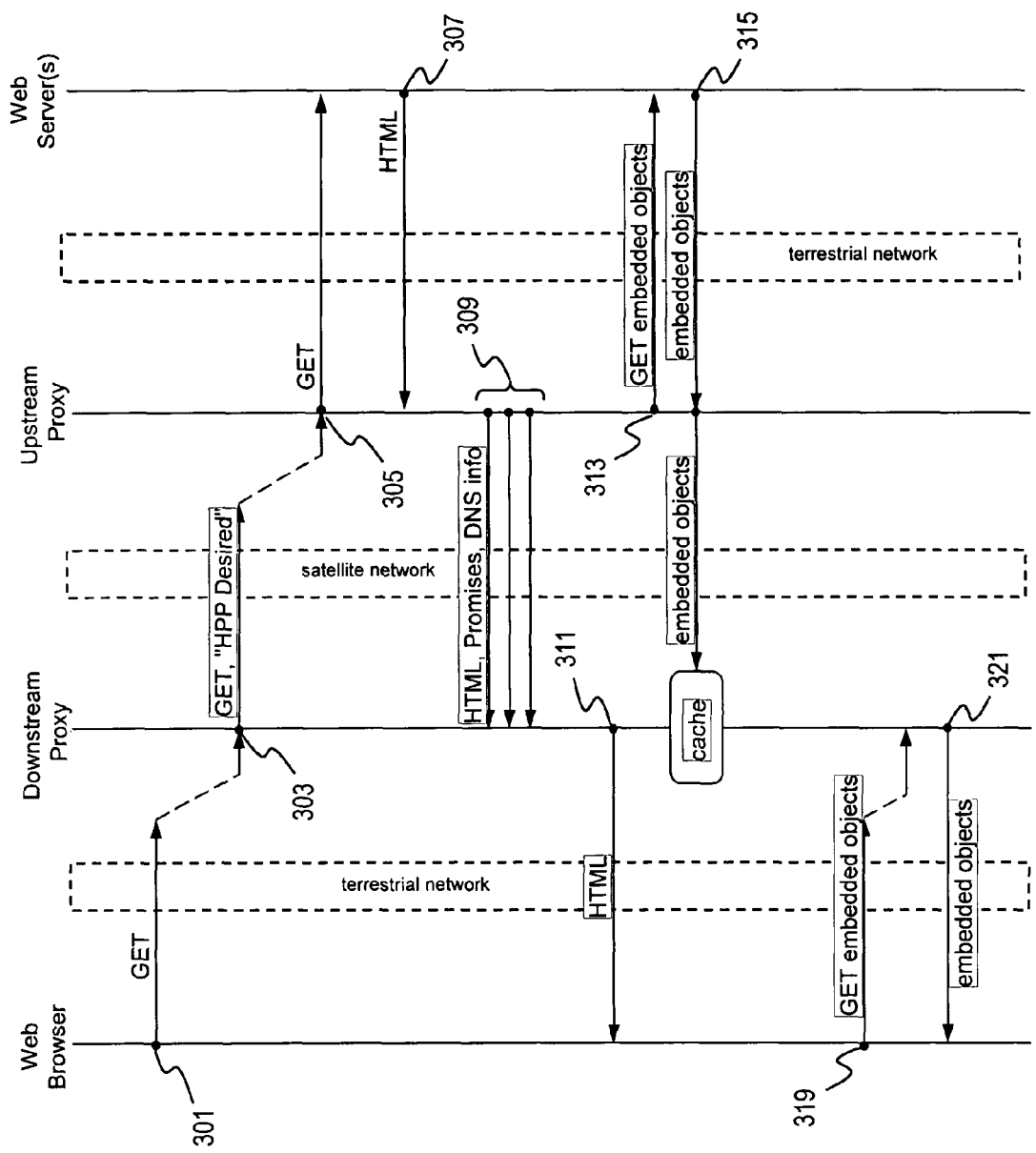
FIG. 3 is a ladder diagram of a parse and pre-fetch process, according to an embodiment of the present invention.

FIG. 3 is a ladder diagram of a parse and pre-fetch process, according to an embodiment of the present invention. To retrieve a web page (i.e., HTML page) from web server 109, the web browser 103 on PC 101 issues an HTTP GET request, per step 301, in response to a user entering a URL or clicking on a link on the web page. In step 303, the downstream proxy 105 intercepts and then forwards the HTTP GET toward the web server 109. The downstream proxy 105 inserts an "optional" HTTP Request Header in the HTTP GET, thereby identifying itself as a HPP downstream proxy. This optional field is denoted as an "HPP Desired" HPPDESIRED field, and more fully described later. This is shown in FIG. 3 as "HPP Desired," which is sent with the GET message. The downstream proxy 105 also maintains state information that associates the URL with the browser TCP connection. It is observed that the HTTP protocol also supports a GET IF MODIFIED SINCE request wherein a web server (or a proxy server) either responds with a status code indicating that the URL has not changed or with the URL content if the URL has changed since the requested date and time. For the purposes of explanation, the HTML page is addressed as URL "HTML."

When the GET request is received from the web browser 103, the downstream server 105 checks its cache to determine whether the requested URL has been previously supplied by an upstream proxy. If the downstream proxy 105 does not have URL HTML stored in cache, the request, GET URL "HTML", is forwarded to the web server 109. In step 305, the upstream proxy 107 intercepts the request, and transmits the GET message to the web server 109 for the HTML page. The upstream server 107 parses the HTML page and requests the embedded objects within the HTML page from the web server 109; the embedded objects are requested prior to receiving corresponding embedded object requests initiated by the web browser 103.

The upstream proxy 107 removes the "optional" HTTP Request Header, which was inserted by the downstream proxy 105, and maintains state information associated with the URL and the downstream proxy TCP connection. The web server 109, as in step 307, sends the requested HTML to the upstream proxy 107.

As the upstream proxy 107 forwards the HTML to the downstream proxy 105, the upstream proxy 107 parses the HTML to identify other web objects referenced therein—e.g., an image on a web page. For each referenced object, per step 309, the upstream proxy 107 sends a "Promise" message to the downstream proxy 105 indicating the upstream proxy's intent to pre-fetch the object and deliver such content to the downstream proxy 105. In addition, the upstream proxy 107 sends DNS requests, as necessary, to resolve the host names for URLs of promised objects, and sends to the downstream proxy 105 DNS information associated with servers bearing the promised objects.

Next, in step 311, the HTML arrives at the downstream proxy 105 and is forwarded to the web browser 103. It should be noted that this step 311 can occur independent of the previous step 309; also, step 311 may happen before the upstream proxy 107 finishes producing "Promise" messages. The downstream proxy 105 holds the "Promise" messages from the upstream proxy 107 and stores the DNS response information in a DNS cache (not shown). According to one embodiment of the present invention, the downstream proxy 105 maintains a timer for each HPP Promise, such that when the timer expires the promise is removed.

Per steps 313 and 315, the upstream proxy 107 retrieves objects referenced within the HTML from the web server 109, and forwards these objects to the downstream proxy 105. The upstream proxy 107 then determines whether the pre-fetched object is to be forwarded to the downstream proxy 105. For example, this determination can statistically minimize wasted bandwidth, in that there are cases when the pre-fetched object is discarded by the downstream proxy 105 (e.g., when there is a cookie mismatch), the determination referenced in the statement compares the size of an object to a threshold that is deemed optimal to avoid wasted bandwidth. The result of the comparison is to "tell" (notify) the downstream proxy 105 to "Bypass" the parse and pre-fetch operation.

In step 317, the downstream proxy 105 holds pre-fetched web objects in memory (e.g., a Random Access Memory (RAM)-based cache) and disposes of the associated promises.

The web browser 103 parses the HTML and issues GETs for objects referenced within the HTML, as in step 319. The downstream proxy 105 intercepts GETs received from the browser 103 and returns the requested objects, from the cache of the downstream proxy 105, per step 321. The arrival order of GETs and "promises" can pose timing issues, such race conditions are more fully described later.

Figure 4:
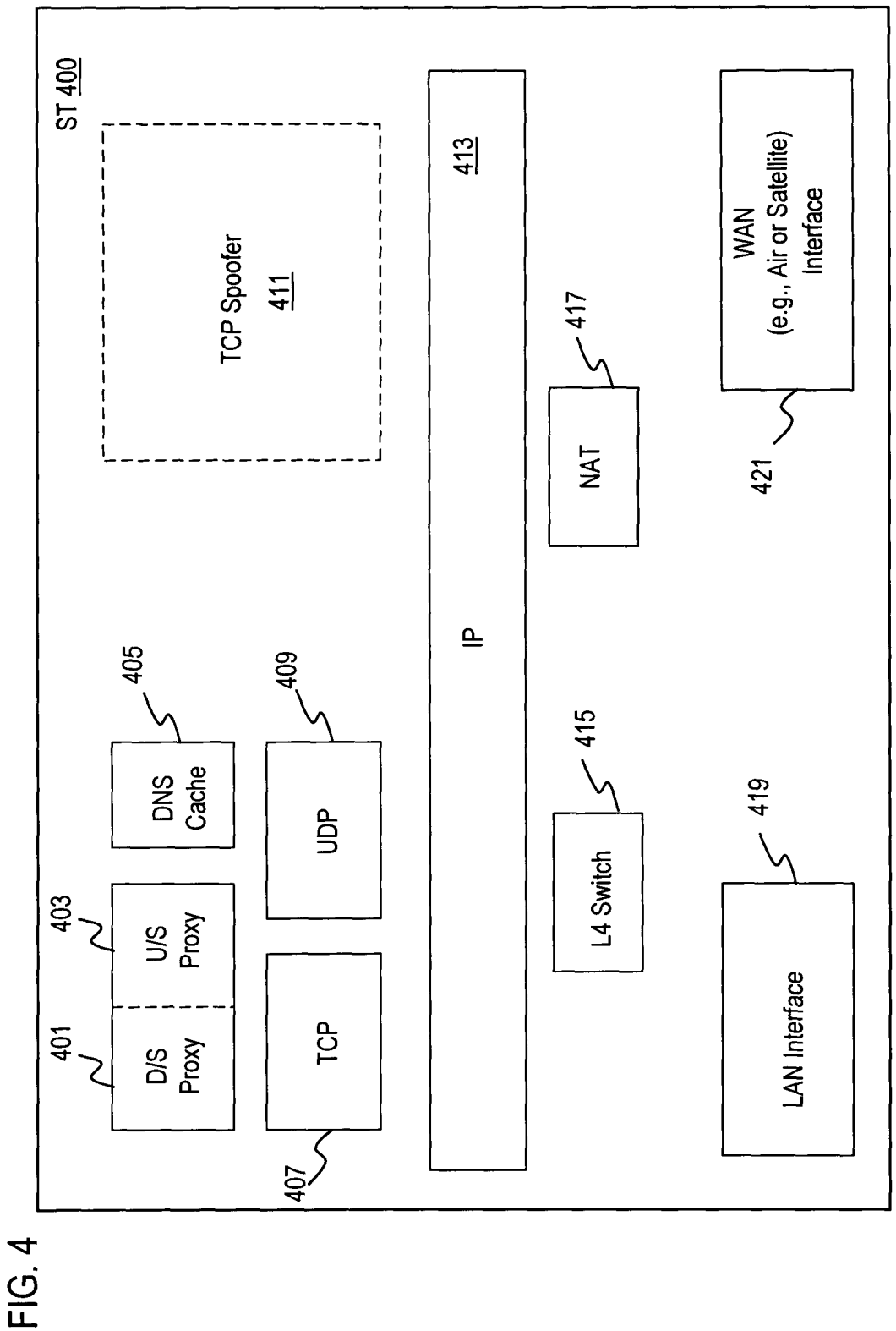
FIG. 4 is a diagram of a protocol architecture for supporting parsing and pre-fetching by a satellite terminal, according to an embodiment of the present invention.

FIG. 4 is a diagram of a protocol architecture for supporting parsing and pre-fetching by a satellite terminal, according to an embodiment of the present invention. As mentioned above, the WAN 111 can be a satellite network. According to one embodiment of the present invention, the functionalities of the upstream proxy 107 and the downstream proxy 105 can reside in a single satellite terminal (ST). The terms "upstream ST" and "downstream ST" refer respectively to the role that is assume by the ST; for example, in one transaction, an ST can behave as an upstream proxy, and thus, is considered an "upstream ST," while in another transaction, the same ST can assume the role of a downstream proxy (i.e., a downstream ST).

Under this scenario, an ST 400 includes both a downstream (D/S) proxy 401 and an upstream (U/S) proxy 403. A DNS cache 405 is also resident within the ST 400. The ST 400 supports TCP and UDP protocol modules 407, 409, respectively. Additionally, a TCP Spoofer module (TSM) 411 can be utilized to further improve performance of the TCP protocol. TCP spoofing is also detailed in commonly assigned, co-pending patent application, entitled "Method and System for Improving Network Performance Using a Performance Enhancing Proxy Architecture" (Ser. No. 09/903,832), which is incorporated herein by reference in its entirety. The ST 400 includes an IP layer 413, along with a Layer 4 switch module 415 and a Network Address Translation (NAT) function module 417. The NAT layer 417 provides address translation between a private network (i.e., a stub domain), such as a local area network (LAN), and a public network, such as the global Internet 113. Address translation is necessary when the LAN utilizes unregistered IP addresses, for example. The NAT layer 417 is detailed in Internet Engineering Task Force (IETF) Request for Comment (RFC) 1631, entitled "The IP Network Address Translator (NAT)," which is incorporated herein by reference in its entirety.

The ST 400 provides a Local Area Network (LAN) interface 419 to support connectivity to a host or a LAN. A satellite interface 421 supports communication with a satellite (not shown).

An important aspect of the proxy architecture of the system 200 is the notion of "transparency," which generally provides that an entity can obtain the benefits of a feature without having to configure that entity to support the feature. Thus, a Web browser 103 (or other applications using HTTP) within the system 200 does not need to be configured with information pertaining to the downstream proxy 401 (such that the downstream proxy 401 is specified as the proxy for the browser 103). In other words, the Web browser 103 does not "know" of the existence of the downstream proxy 401, and thus, the downstream proxy 401 operates transparently with respect to the browser 103. In this manner, HTTP communication is possible even if a HPP downstream proxy 401 is not present in the ST 205 supporting the Web browser's host 101.

Furthermore, the downstream proxy 401 (within ST 205) need not be configured with information pertaining to the upstream proxy 403 (within ST 203). However, while the downstream proxy 401 does not need to know beforehand that an upstream proxy exists in the path from the downstream proxy 401 to the Web server 109, the downstream proxy 401 does process messages generated by the upstream proxy 403 of the ST 203. The addressing and routing towards the upstream proxy 403 of the ST 203 is, from the downstream proxy's perspective, entirely transparent. In this manner, HTTP communication continues even in the case where no upstream proxy exists in the next-hop ST. This capability is particularly valuable because, as described earlier, the existence of an upstream proxy 403 is not guaranteed in a mesh network environment, such as the system 200.

In accordance with an exemplary embodiment, transparency can be implemented through a Layer 4 (L4) switch 415 within the upstream and downstream STs 203, 205. As used herein, Layer 4 refers to the transport layer of the OSI (Open Systems Interconnection) model; it is recognized, however, that Layer 4 may denote any equivalent protocol. Upon detection of a condition within Layer 4, the L4 switch 415 examines IP datagrams and, if certain conditions are met, changes IP addresses and/or port numbers in the IP and TCP headers of such datagrams. These changes redirect a packet from the destination indicated in its header to modules (or elements) within the ST. One approach to effecting this is to maintain some state information within the L4 switch 415 (as more fully described later). Alternatively, a transparent design could be achieved without the L4 switch 415, by modifying the TCP Spoofer 411 (which can maintain the state information).

The operation of the L4 switch 415 is now described. However, it is instructive to establish certain notations to describe such operations in the context of HTTP parse and pre-fetch. For example, the L4 switch 415 can change an IP datagram, denoted by (A1,A2)[p1,p2], to another IP datagram, denoted by (A3,A4)[p3,p4], where Ax are IP addresses, and px are port numbers;

$$(A1,A2)[p1,p2] \rightarrow (A3,A4)[p3,p4].$$

In this example, the source IP address of the IP datagram is changed from A1 to A3. The destination IP address is changed from A2 to A4. The L4 switch 415 also alters the source port number from p1 to p3, while the destination port number is changed from p2 to p4.

The L4 switch 415 defines and processes a number of TCP port numbers: L4 switch protocol port number, L4 switch proxy port numbers, and L4 switch ephemeral port numbers. L4 switch protocol port numbers represent a set of TCP port numbers for which packets having these numbers as the source port number are to be operated on by the proxies (for example, TCP port 80, identifying HTTP). The L4 switch proxy port numbers are TCP port numbers that have been assigned to each of the downstream and upstream proxies (for example, TCP port 8080 for the downstream proxy 401, and TCP port 8081 for the upstream proxy 403). Lastly, the L4 switch ephemeral port numbers provide a range of TCP port numbers that the L4 switch 415 may use when performing forward switch processing (described below).

The L4 switch 415, according to one embodiment of the present invention, provides a couple of basic operations upon an IP datagram. First, the L4 switch 415 performs a "forward process" and then sends a packet up the protocol stack. Second, the L4 switch 415 also performs the reverse of the operation (or "reverse processing") after a packet has been sent down the protocol stack.

The forward process is performed on the IP datagram with header information (A1,A2)[p1,p2] as follows. The L4 switch 415 first obtains the destination IP address and moves this address to the source IP address position. Next, the destination IP address is set to the IP address of the L4 switch 415. Because the L4 switch 415 can reside within a routing entity, such as ST 400, two IP separate addresses can be used: IP address of the LAN interface 419, and the IP address of the satellite (or air) interface. For the satellite network 200, the L4 switch 415 can be configured to use the LAN-side IP address (which is a globally-routable address). It is noted that the selection of this address can be determined based upon NAT considerations.

According to one embodiment of the present invention, the L4 switch 415 performs forward processing upon an IP datagram based on a number of requisite conditions. First, neither the source IP address nor the destination IP address of the IP packet can be that of the ST. Second, the ingress interface upon which the IP datagram arrived and the egress interface for forwarding the datagram are different. Also, the destination port of the IP datagram belongs to one of the L4 switch configured protocol port numbers (e.g., TCP port 80 for HTTP).

The parse and pre-fetch proxy utilizes this source address in setting up TCP connections. The destination port number is set to a configured port number (one of the L4 switch proxy port numbers), pC, on which the application of interest (e.g., proxy) is listening. As mentioned, the downstream and upstream proxies can both reside in a single ST; in which case, the L4 switch 415 determines, with respect to the application of interest, to which proxy the IP datagram should be forwarded. This determination can be made by considering the input interface of the IP datagram. If the input interface is the LAN, then the TCP port chosen is that assigned to the downstream proxy 401. If the input interface is the satellite interface 421, then the TCP port chosen is that assigned to the upstream proxy 403.

A new port number (one of the L4 switch ephemeral port numbers), p3, is assigned to the source port position, such that pC allows the new four-tuple of header information to be unique, assuming state has not already been created for it. Next, state information—a rule —is created associating the "original" four-tuple with the "new" four-tuple. This state is created when the L4 switch 415 recognizes that the packet contains the TCP <SYN> identifier; i.e., when the transport layer conditions reveal a new transport layer session is being established. The resulting "processed" packet is sent to the protocol stack. The above steps can be summarized with the notation (defined earlier), and denoted as "forward L4 switch processing":

(A1,A2)[p1,p2]→(A2, Aitself)[p3,pC].

In the above notation, Aitself denotes the address of the proxy. The "reverse" operation performed on an IP datagram having header information four-tuple (Aitself,A2)[pC,p3] by the L4 switch 415 is now described. This process is referred to as "reverse L4 switch processing." The L4 switch 415 searches its state table for a match of the four-tuple of the packet being processed to the reverse of the output specification of a rule that was defined earlier, wherein "reverse" means having source and destination parameters exchanged. For example, in the foregoing description of "forward L4 switch processing," the output specification is (A2,Aitself)[p3,pC]; an exchange of the source and destination parameters yields (Aitself,A2)[pC,p3]. This is exactly the four-tuple of header information for the IP datagram being processed, and thus, the prescribed match has been found.

The L4 switch 415 next replaces the packet's four-tuple with the reverse of the four-tuple of the input specification as specified in the L4 switch state entry (that was just found). That is, the following conversion is performed:

(Aitself,A2)[pC,p3]→(A2,A1)[p2,p1].

This is the "forward" rule with each of the input and output specifications reversed, and then input/output specifications interchanged. The L4 switch 415 then performs a route lookup on the new packet to determine whether the appropriate outbound interface is to the LAN interface 419 or to the satellite interface 421. The L4 switch 415 forwards the new packet to that interface for forwarding. Thus, the L4 switch 415 is able to perform reverse processing upon an IP datagram based on two conditions: the IP source address of the IP datagram is that of the L4 switch 415; and, a match being found in the L4 switch state (rules) table.

In general, the L4 switch 415, the parse and pre-fetch proxies 401, 403, and the TCP spoofer 411 may be constrained by the number of connections that can be supported. Also, TCP connections can be unexpectedly closed or reset. For example, if the L4 switch 415 reaches its maximum number of rules, the L4 switch 415 does not attempt to create new rules. Also, a packet that would ordinarily cause a new rule to be created would not be handled by the L4 switch 415. Consequently, the packet, in the "forward" (i.e., upstream) direction, would not encounter the parse and pre-fetch proxy at the terminating ST, and HTTP operation without parse and pre-fetch enhancement would be experienced. This un-enhanced operation would continue until a new connection can be created. It is noted that an existing un-enhanced connection would not switch to enhanced operation because the L4 switch 415 creates rules only when encountering TCP <SYN> packets. This situation does not occur in the "reverse" (i.e., downstream) direction since connection initiation for HTTP parse and pre-fetch is always initiated by a downstream entity towards an upstream entity.

If a downstream proxy 401 or upstream proxy 403 reaches its maximum number of connections opened toward the Web server 109, the associated L4 switch does not attempt to create new switch rules by which packets of a new connection would be directed to the parse and pre-fetch proxy service. As described above, this causes packets of a new connection to skip the parse and pre-fetch proxy service. In some instances, however, an existing rule may cause a GET from a downstream entity (e.g., the browser 103 or downstream proxy 401) to be directed to a particular proxy (downstream or upstream, respectively), and the proxy may at that time need to open one or more new TCP connections.

In an exemplary embodiment, if a downstream TCP spoofer cannot create a new spoofed connection, the TCP connection is carried unspoofed, for the entire duration of the connection. In such a scenario, communication is still possible, but without the advantages of TCP spoofing. If an upstream TCP spoofer cannot create a TCP connection toward the web server 109, an error message is returned to the corresponding downstream spoofer. This causes the downstream spoofer to issue a TCP <RST> on the TCP connection originated by the downstream proxy 401. The downstream proxy 401 would then have to retry the connection. Because of the recent prior failure to establish a spoofed TCP connection, the TCP spoofer does not attempt to spoof the connection, and so the connection is carried unspoofed.

There may be cases where an HTTP Redirection results in the URL of the destination Web server identified in the HTTP Redirect object is located behind a different ST (next hop) than the Web server of the original object. In such a case, the upstream proxy 403 can be configured to return the HTTP Redirection to the downstream proxy 401, which then in turn forwards the HTTP Redirection to the browser 103. Alternatively, the upstream proxy 403 can be configured to only return the HTTP Redirection to the downstream proxy 401 if a route lookup at the ST hosting the upstream proxy 403 results in a different next hop ST.

Furthermore, there may be scenarios in which there are embedded objects of a parsed page that are located behind STs other than the ST hosting the upstream proxy 403 that parsed the HTML page. These scenarios fall within the description of Full-Mesh scenarios, as described earlier. The parse and pre-fetch service can be provided in a full-mesh environment. By way of example, an HTML page is parsed by the upstream proxy 403 at ST 203 (FIG. 2); however, an embedded object from that parsed page may be found behind another ST 207 at a different web server (IP address) (not shown). Accordingly, the upstream proxy 403 at ST 203 sets up a TCP connection to this different web server; the TCP connection is to be routed over the satellite link (with TCP/PEP). The L4 switch at the ST 207 then forwards the TCP connection to the upstream proxy 403 (within ST 207) without use of the HPP optional headers. The upstream proxy 403 at ST 207 receives the embedded object from the web server and returns the object to the upstream proxy 403 at ST 203. The upstream proxy 403 at ST 203 would have already issued a promise and DNS information for this object. When the upstream proxy 403 receives the object from ST 207, the proxy forwards the object to the downstream proxy 401 at the ST 205 of the original HTML page. The browser 103 then retrieves the object from the cache of the downstream proxy 401. In the mesh scenario, the parse and pre-fetch service can operate, but without conveying the benefit of reduced latency of the network 111.

As shown in FIG. 4, the downstream proxy 401 and DNS cache reside within the same ST 400. These two features are enabled/disabled independently. However, if an ST operating a downstream proxy 401 cannot terrestrially access a DNS server, then the DNS cache within that ST is enabled. DNS cache lookups conducted on behalf of DNS requests that are generated by the downstream proxy 401 can be performed on preloaded DNS entries —if the DNS cache preload receiver function is enabled at that ST. However, if the DNS cache 405 within the ST 400 is disabled, then any DNS information received by the downstream proxy 401 is discarded.

As shown, the ST 400 includes the DNS cache 405 to reduce DNS lookup delays experienced by applications running on hosts connected to the ST via the LAN interface 419. The DNS cache 405 behaves as a DNS server for responding to DNS queries. The cache 405, in an exemplary embodiment, includes an "answer cache" for storing responses to DNS queries, and a "preload cache," which stores DNS information "pushed" to the STs. The DNS answer cache stores DNS responses ("answers") in order to service subsequent DNS requests To ensure integrity of the cached information, a DNS query is sent over the network 111 for each query received via the LAN interface 319, regardless of a cache hit or miss, and the response is used to update the cache.

By way of example, two scenarios are considered with respect to the DNS service of the ST 400. In the first scenario ("nontransparent DNS service"), it is assumed that a customer equipment, for example, is configured to use the DNS service within the ST 400 as a DNS server. In the second scenario, the customer equipment requires no special configuration to utilize the DNS service; this service is referred to as "transparent." With a nontransparent DNS, the DNS resolvers in the customer equipment are configured with the ST's LAN interface's IP address as the IP address of a name server; also, the name servers are configured accordingly for the query. The DNS service need not support zone transfers (although over-the-air preloading of the cache is supported), since zone transfer traffic can consume significant capacity of the network 111. Also, the DNS service needs to support sending recursive queries, since iterative queries can be slow (particularly, if conducted over a high propagation delay space link). With respect to sending only "Recursion Desired" queries, the DNS service appears as a resolver to network nodes reached by the space link. Further, the DNS service can support sending of all queries with "Recursion Desired" indicated, even in the case of queries being issued to answer queries received from the LAN without "Recursion Desired" indicated. It is noted that recursively servicing a query not indicating "Recursion Desired" can "interfere with trouble shooting of name servers and their databases," according to, for example, IETF RFC 1034, which is incorporated herein by reference it its entirety.

It is noted that even if there is a DNS server local to the downstream proxy 401, the DNS cache should be enabled in the downstream ST to exploit the DNS information forwarded by the upstream proxy 403. The architecture of FIG. 4 advantageously provides the flexibility of supporting any combination of parse and pre-fetch proxies: upstream and downstream proxies enabled; upstream proxy disabled, downstream proxy enabled; and upstream and downstream proxies disabled. Under this arrangement, the parse and pre-fetch service is transparently provided, thereby ensuring interoperability with network elements that do not support the downstream proxy 401 or the upstream proxy 403.

From the standpoint of security, the parse and pre-fetch service can be vulnerable to attack. Two areas of vulnerability are considered. The first involves the scheme of promises and pre-fetched objects. For example, an attacker could pretend to be an upstream proxy 403 and send HPPAwait messages and promises to the downstream proxy 401, and then either not provide the promised objects, or provide counterfeit objects. HPPAwait messages indicate that parse and pre-fetch promises are forthcoming. The second vulnerable component is the DNS information provided by the upstream proxy 403 to the downstream proxy 401. An attacker could send a forged DNS entry which would effectively redirect a user from an intended Web server to the attacker's Web server, by which the attacker could glean passwords from bogus service logon pages or conduct other mischief.

In view of the above concerns, the upstream proxy 403, in an exemplary embodiment, calculates an MD5 hash upon promises and DNS entries and a configured password, and sends the hash with that information. The MD5 hash algorithm is more fully described in IETF RFC 1321, which is incorporated herein by reference in its entirety. The downstream proxy 401, also configured with the same password, uses this MD5 hash to authenticate the received information as having come from a legitimate upstream proxy 403. If the hash check fails, the downstream proxy 401 discards, at minimum, the information which the hash is intended to authenticate. Also, the DNS answer cache of the ST can accept an unsolicited DNS entry only from the downstream proxy 401—once the downstream proxy 401 has authenticated such an entry.

Additionally, connections which originate from "unexpected" points of entry are denied by the ST 400, regardless of actual discernable malice. Thus, for example, a downstream proxy 401 does not accept connections from the satellite link, and an upstream proxy 403 does not accept connections from the LAN interface.

Figure 5B:
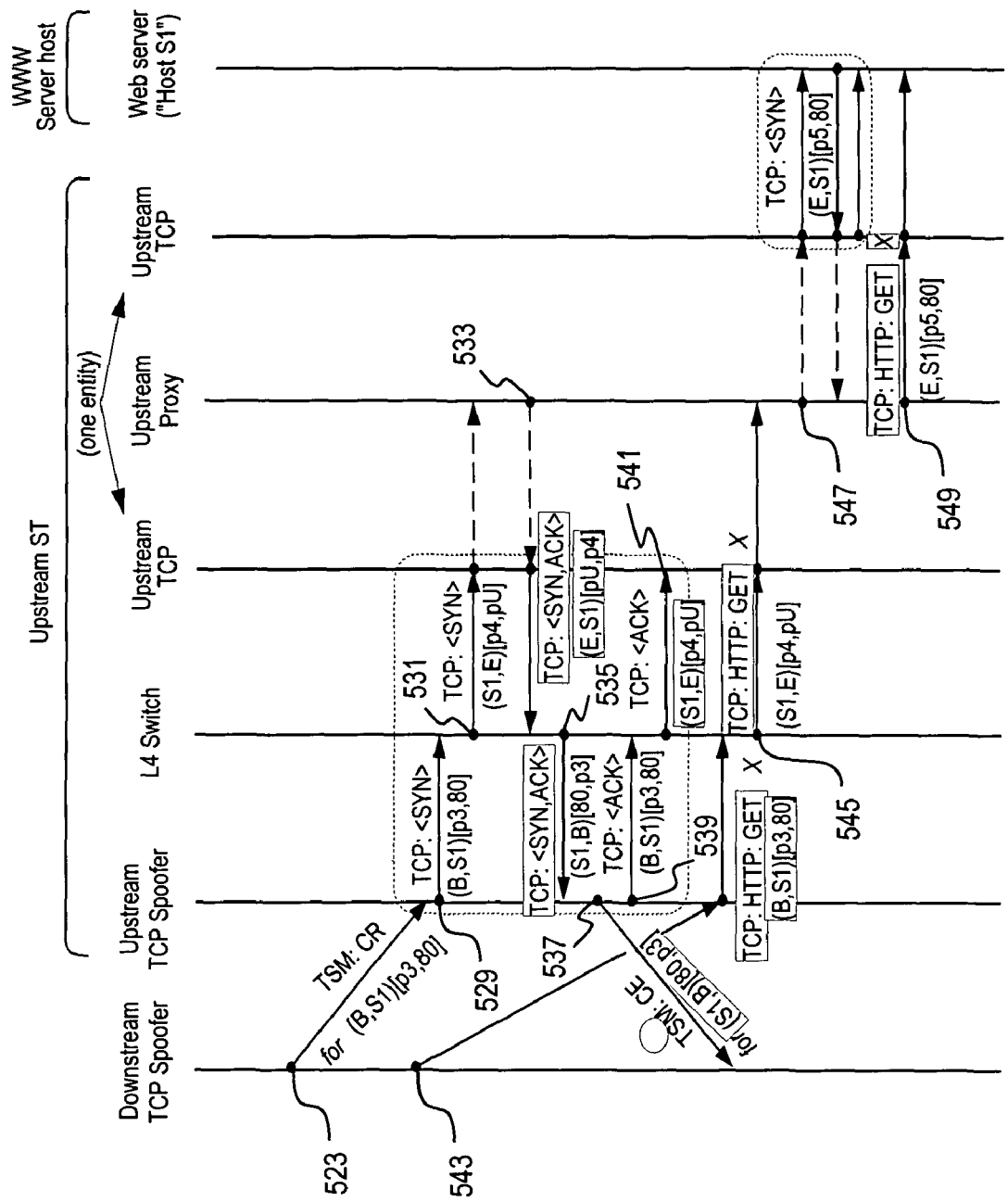

FIGS. 5A and 5B show a ladder diagram of communications from a downstream satellite terminal (ST) to an upstream ST in support of a parse and pre-fetch process, according to an embodiment of the present invention. By way of example, the parse and pre-fetch operation is described with the notation listed in Table 1, below:

TABLE 1

| NOTATION | DEFINITION |
| --- | --- |
| A | IP address of the Web-browsing host |
| B | IP address of the downstream ST's LAN interface |
| C | IP address of the downstream ST's air interface (for user traffic) |
| D | LP address of the upstream ST's air interface (for user traffic) |
| E | IP address of the upstream ST's LAN interface |
| S1 | IP address of the first Web server contacted |
| S2 | IP address of the second Web server contacted |
| W | destination port number |

By way of example, IP addresses for the ST air interfaces, namely addresses C and D, are class-E IP addresses, and thus, are not routable outside of the network 111. Hence, any IP datagram that may traverse links outside of network 111 may not bear address C or D, but must instead bear address B or E, respectively. Also, the port numbers used in FIGS. 5A and 5B are TCP port numbers, with the exception of the DNS query/response messages, which are carried by UDP.

For the purposes of explanation, the parse and pre-fetch operation is described under a simplified scenario. For example, the scenario shown in FIGS. 5A and 5B involves the retrieval of a Web page that includes HTML and one image. Also, it is assumed that the downstream ST has the DNS answer within its cache for DNS information needed by the Web browser 103. It is also assumed that the browser 103 requests the particular image object after that object has been completely pre-fetched and provided to the downstream proxy 401.

In step 501, at a WWW client host 101, a user enters into a browser 103 a URL for an object X on a Web server 109 (with domain name "Host S1"). Object X is assumed to be HTML for the Web page of the server 109. To retrieve this object, the browser 103 opens a TCP connection to the server 109 ("Host S1"), by first resolving this host name into an IP address. Given the assumption of this example, the client host 101 has already been configured with W as the IP address of a DNS server 117. Accordingly, the Web browser 103 issues to W a DNS request for resolving "Host S1"; such a message is typically a UDP/IP datagram addressed to UDP port 53, for example. For purposes of illustration, the ephemeral port number selected by the host for this message is p0. The IP datagram is routed to the ST 205.

Next, in step 503, the IP datagram bearing the DNS query enters the LAN interface 419 of the downstream ST 205. The ST 205 intercepts the DNS query and, assuming a cache hit, provides the requested DNS information from the DNS answer cache within the ST 205. Specifically, the DNS response indicates that the host name "Host S1" corresponds to IP address S1. The design of the DNS answer cache calls for the query to then be possibly forwarded over the air to maintain cache coherence.

The downstream ST 205, as in step 505, receives the DNS information and opens a TCP connection to the Web browser 103. The Web browser 103 issues a TCP <SYN>, for ultimately sending an HTTP GET, with (source, destination) IP addresses of (A, S1) and [source, destination] TCP ports of [p1, 80], where p1 is an ephemeral port number chosen by the operating system hosting the Web browser 103. Next, the IP datagram bearing the TCP <SYN> enters the LAN interface 419 of the downstream ST 205, per step 507. The downstream ST 205 determines that the IP datagram's outbound interface, for purposes of routing, can be the air interface 421, and provides the IP datagram to the L4 switch 415. The L4 switch 415 examines the IP datagram. At this point, the conditions for forward L4 switch processing are satisfied, since TCP port 80 is configured in the L4 switch 415 as a port number for which forward processing is indicated. The port number for the downstream proxy 401, pD, is also configured in the L4 switch 415. The IP datagram header information is modified according to the "forward switch processing" operation described earlier. In this case, the L4 switch 415 selects port number p2 as part of this processing. The L4 switch 415 then forwards the IP datagram to the ST's TCP layer 407.

The TCP layer 407 of the ST 205 notifies the downstream proxy 401 of the connection's opening, and composes a TCP <SYN,ACK>, as in step 509. The corresponding IP datagram bears header information (B,S1)[pD,p2]. This IP datagram is provided to the L4 switch 415. The conditions for reverse L4 switch processing are satisfied, and the IP datagram header information is modified according to the "reverse L4 switch processing" operation, as described earlier. The IP datagram is then discharged upon the LAN interface 419.

In steps 511 and 513, the Web browsing host 101 receives the TCP <SYN,ACK> and responds with a TCP <ACK>. The ACK is then processed by the ST 205, which forwards the TCP <ACK> IP datagram through the IP layer 413 and L4 switch 415 to the ST's TCP layer 407, as described above (step 507) for the TCP <SYN> IP datagram, per step 515. This completes TCP's three-way handshake between the Web browsing host 101 and the ST 205. From the Web browsing host's perspective, it has established a TCP connection with the Web server application on the server 109 ("Host S1"); the host 101 does not "know" that the TCP connection is effectively terminated within the downstream ST 205.

In step 517, the Web browser 103 issues an HTTP GET for object X, namely the HTML for a Web page. This IP datagram arrives at the downstream ST 205 bearing IP header information (A,S1)[p1,80]. As described above, the header information of this IP datagram is translated to (S1,B)[p2,pD] by the L4 switch 415 (per step 519), and the result is provided through the ST's TCP layer 407 to the downstream proxy 401 through a standard "socket" interface.

The downstream proxy 401 receives the HTTP GET as well as the (S1,B)[p2,pD] information. In step 521, the downstream proxy 401 checks for the following: (a) whether its cache contains the object specified in the GET, and, if such an object is found, (b) and whether the cached object is marked as having come from IP address S1 for port p2, and have been retrieved from the server with the correct cookie. This latter check, (b), is used to properly associate GETs and pre-fetched objects. It is assumed for the sake of discussion that the required object is not in the downstream proxy's cache. Because the object is not in the cache, the downstream proxy 401, using the TCP layer 407, opens a TCP connection to the Web server 109. Specifically, a TCP <SYN> is generated, and sent in an IP header bearing information (B,S1)[p3,80]. In this case, address B is used as the source address because it is an IP address which is routable outside of the network 111, and the existence of an upstream proxy 403 to terminate the TCP connection is not guaranteed. It is observed that address S1 is that of the Web server 109. Port number p3 is an ephemeral port number selected by the TCP layer 407 for this connection, and port 80 is the TCP port number for the server 109. The IP datagram composed in the previous step 519 is provided to the IP layer 413, which determines that this TCP-carrying IP datagram is for a TCP flow which should be spoofed.

In step 523, the TCP spoofer 411 communicates to its peer in an upstream ST (e.g., ST 203), as determined by routing, the need to establish a spoofed TCP connection corresponding to (B,S1)[p3,80]. This is accomplished with a TCP Spoofer Module (TSM) "Connection Request" (CR) message. Because HTTP applications require low latency, the TCP spoofer 411 is configured to spoof TCP's three-way handshake for traffic destined to TCP 80 (this configuration is assumed for the remainder of this discussion). With three-way handshake spoofing enabled, the TCP spoofer 411 returns a TCP <SYN,ACK>, as in step 525, without waiting to learn from the peer spoofer that the connection with the ultimate far-end host has been established. The TCP layer 407 in the downstream ST returns a TCP <ACK> to complete the three-way handshake, per step 527.

In step 529, once the TSM CR message arrives at the upstream ST 203, the TCP spoofer 411 in this upstream ST 203 issues a TCP <SYN> in an IP datagram with information (B,S1)[p3,80]. The routing process within the ST 203 determines that the outbound interface for this IP datagram is the LAN interface 419. If the TCP spoofer 411 determines that the outbound interface for this IP datagram is the network 111, then the TCP spoofer 411 drops this packet and the ST 203 issues a "Satellite Redirect" message back to the downstream ST 205. In this case, the spoofed TCP connection setup attempt of step 523 fails and times out, and the connection setup is attempted again. The downstream ST 205 will have the correct route at that point to allow the process to continue.

At this point, the conditions for forward L4 switch processing are satisfied, again because TCP port 80 is configured into the L4 switch 415 as a port number for which forward processing is indicated. The port number for the upstream proxy 403, pU, is also configured in the L4 switch 415. The IP datagram header information is modified according to the "forward L4 switch processing" operation described earlier; pU is selected as the port to which the switch 415 directs the packet because the inbound interface for the packet is the air interface. In this case, the L4 switch 415 selects port number p4 as part of this processing. The L4 switch 415 then forwards the IP datagram to the ST's TCP layer 407, as in step 531.

The ST's TCP layer 407 notifies the upstream proxy 403 of the connection's opening, and composes a TCP <SYN, ACK>, per step 533. The corresponding IP datagram bears header information (E,S1)[pU,p4]. This IP datagram is provided to the L4 switch 415. The conditions for reverse L4 switch processing are satisfied, and the IP datagram header information is modified according to the "reverse L4 switch processing" operation described earlier. The IP datagram is then discharged toward the downstream ST 205, via the TCP spoofer 411.

From the receipt of the TCP <SYN,ACK>, the TCP spoofer 411 determines that the desired TCP connection has now been opened. In step 537, the spoofer 411 notifies its peer spoofer of this development, with a TSM "Connection Established" (CE) message. The TCP spoofer also issues, per step 539, a TCP <ACK> to complete the three-way handshake procedure for the connection.

In step 541, the IP datagram bearing the TCP <ACK> is forwarded through the IP layer 413 and the L4 switch 415 to the ST's TCP layer 407, as described above for the TCP <SYN> IP datagram, thereby completing the three-way TCP handshake between the TCP spoofer 411 of the upstream ST 203 and the TCP layer 407 of that ST 203, supporting the upstream proxy 403. From the spoofer's perspective, a TCP connection has been established with the Web server 109 of interest (having IP address S1). From the perspective of the upstream proxy 403, a TCP connection has been established with the downstream proxy 401 of ST 205 (represented by IP address B).

At the downstream ST 205, once that ST's TCP layer 407 receives the TCP <SYN,ACK> (which the TCP layer 407 believes to have been issued by the web server), the downstream proxy 401 can use that TCP connection. The downstream proxy 401 opened this TCP connection to the Web server, beginning in step 521, to retrieve an object specified in an HTTP GET received from the Web browsing host 101. Having accomplished the opening of the connection, the downstream proxy 401 of the ST 205 now issues to the server 109 an HTTP GET for that object, per step 543. This GET bears a special tag ("HPPDesired") to indicate to a possible upstream proxy 403, if one should exist, that parse and prefetch operation is both supported and desired. This tag is inserted in the HTTP stream in a fashion which would cause the tag to be ignored if this special GET were to arrive directly at the Web server 109 (which is the case if there is no upstream proxy 403). This GET from the downstream proxy 401 is carried over the air to the upstream ST 203 via TCP spoofing.

In step 545, at the upstream ST 203, the IP datagram bearing the HTTP GET is directed to the L4 switch 415. The L4 switch 415 changes address and port number information to redirect the GET to the upstream proxy 403, as was performed earlier in step 527. The upstream proxy 403 examines the "HPPDesired" tag in the GET, as in step 547, and realizes that a HPP downstream proxy 401 must have composed the GET. The upstream proxy 403 checks its history of issued promises and finds that it has not recently promised the requested object to the downstream proxy 401.

The upstream proxy 403 accordingly retrieves from the Web server 109 the object specified in the GET. In particular, the upstream proxy 403 opens a TCP connection, using ephemeral port number p5, to the Web server 109. The upstream proxy 403 may conduct a DNS lookup to determine the IP address of the Web server specified in the GET, or the proxy 403 may use the Web server IP address, S1, in the header information received with the GET. To properly deliver the requested object (once returned by the Web server 109), the upstream proxy 403 makes an association between the TCP connection upon which the GET arrived from the "air" and the TCP connection upon which the GET is sent to the Web server 109. That is, the upstream proxy 403 notes the following association of connections:

$$\text{Object X: air} \leftarrow\!\!\rightarrow \text{LAN} :: (S1,E)[p4,pU] \leftarrow\!\!\rightarrow (E,S1)$$
$$[p5,80]$$

It is noted that because the upstream proxy 403 can open multiple TCP connections to the Web server 109, and because multiple downstream proxies can request the same object, it is important to associate complete air-LAN header information—namely, the entire 4-tuple of IP addresses (in the case of IP Version 4) and port numbers for the two connections—for each object. As a result, when object X is returned from the Web server 109, the upstream proxy 403 has knowledge of the particular TCP connection to send that object toward the air interface.

In step 549, once the TCP connection from the upstream proxy 403 to the Web server 109 has been opened, the upstream proxy 403 issues an HTTP GET for the object.

The parse and pre-fetch operation entails, as described above, establishing multiple TCP connections (or spoofed versions of such connections) to retrieve Web objects from the web server 109. Accordingly, the browser 103 can open TCP connections towards web servers (e.g., server 109); these connections are terminated within the downstream ST 205. The downstream ST 205 opens TCP connections towards the web server 109, wherein these connections are terminated within the upstream ST 203. The upstream ST 203 then opens TCP connections with the Web server 109 to retrieve the content.

In general, the Web browser 103 can establish multiple TCP connections with the Web server 109. The downstream ST 205 forwards each object that is received either from the upstream ST 203 or directly from the web server 109, on the same TCP connection as the one upon which the corresponding GET arrives. Furthermore, on each such TCP connection, the downstream ST 205 returns the requested objects in the same order as requested. According to an embodiment of the present invention, the downstream ST 205 can support a variety of HTTP protocols, such as IETF RFC 2616 (HTTP Ver. 1.1) and RFC 1945 (HTTP Ver. 1.0) for communication with the web browser 103.

From a performance standpoint, it is important to consider whether the downstream ST 205 should open a TCP connection over the satellite link (i.e., "over-the-air"), even in the case in which the object in question has not yet been received. By way of example, four scenarios are considered, involving new HTTP transactions. In the first scenario, the new HTTP transaction involves a new object, however, the Web browser 103, the upstream ST 203, and the web server 109 are the same as in a recent transaction. In this instance, it may be desirable to permit the downstream ST 205 to create a new TCP connection over-the-air to associate, in a one-to-one fashion, with each TCP connection created by the browser 103. According to one embodiment of the present invention, three-way handshake spoofing can be utilized, such that minimal delay is incurred for establishing a new spoofed TCP connection. It is noted that the upstream ST 203 may deliver a promised object, while the downstream ST 203 concurrently requests that object on a different TCP connection. Hence, the downstream ST 203 can accept a delivered object from the TCP connection upon which the object was requested, or from a TCP connection upon which the object is promised. Under this first scenario, the downstream ST 205 can either open a new TCP connection, or alternatively, use any existing TCP connection between the two proxies for transporting pre-fetched objects.

In the second scenario, a new HTTP transaction involves a new web server (not shown) that is reached through the same upstream ST 203. In general, the downstream ST 205 cannot be certain or expect that an upstream proxy 403 is available for every Web server. As a result, the downstream ST 205 needs to open a new TCP connection when contacting a new Web server, potentially introducing some initial delay that may be perceived by the user. Such delay is believed to be acceptable, since typical Internet users are accustomed to experiencing some "initial" delay when contacting a new Web server. From an implementation perspective, this scenario can be view as if the new flow involves a new upstream ST (which is the third scenario described below).

A third scenario provides a new HTTP transaction supported by a new upstream ST (presumably to reach a new web server). In this case, it is clear that a new TCP connection is required, as a new upstream ST is involved. The second scenario necessarily implies that a new TCP connection is required in this third case.

In the fourth scenario, the new HTTP transaction involves a new Web browsing host. As mentioned the context of the second scenario, Internet users are accustomed to some initial delay when contacting a new Web server. This would suggest that opening a new TCP connection would be acceptable. However, the L4 switch 415 masks from the downstream ST 205 the IP address of the web browsing host. Hence, the downstream ST 205 does not know whether a new Web browsing host is involved or if, instead, a new TCP connection has been created by an "existing" Web browsing host 101.

Examination of the above scenarios reveals that the downstream ST 205 has the capability to accept a delivered object from the TCP connection upon which the object was requested, or a TCP connection upon which the object is promised. It is noted that with the parse and pre-fetch capability, objects can be sent by the upstream proxy 403 either in response to a GET sent by the downstream proxy 401 or as a result of a pre-fetch operation. For an object in this latter category, there will likely not be an antecedent GET. However, because a promise for an object precedes any pre-fetched object, the downstream proxy 401 can determine which objects are provided in response to GETs—either by an upstream proxy 403 or an actual Web server—and which objects are provided as part of pre-fetch operation.

It is recognized that because web server platforms can differ and that the messages sent from the downstream proxy 401 towards the Web server may actually reach the web server (i.e., no upstream proxy 403), the downstream ST 205 should support various HTTP protocol versions such that content retrieval can be achieved without an upstream proxy 403. For example, HTTP Ver. 1.0 allows a Web client (or Web server) to close a connection once an object has been received (or sent). For parse and pre-fetch, the downstream ST 203 may close a TCP connection upon receipt of an explicitly requested object being received without an HPPAwait tag, or if all objects previously promised on a TCP connection have been received (but, the downstream ST 203 does not close the TCP connection otherwise). Thus, in an exemplary embodiment, the downstream ST 203 supports HTTP Ver. 1.1, affording the advantages of mandatory persistent connections and optional pipelining of requests and object deliveries.

As noted, communication between the upstream ST 203 and the web server 109 can involve establishing multiple connections with the web server 109 to fetch multiple objects simultaneously over these connections. Each object has to be sent over the "correct" TCP connection to the downstream ST 203. In this context, the "correct" connection involves the following three exemplary scenarios. First, if the upstream proxy 403 retrieves an object in response to a GET message from the downstream proxy 401, the upstream proxy 403 forwards that object to the downstream proxy 401 on the same TCP connection in which the GET was received. Second, if the upstream proxy 403 retrieved an object as part of a pre-fetch operation, the upstream proxy object forwards that object to the downstream proxy 401 on the same TCP connection in which the promise for that object was sent. The third scenario is if the upstream proxy 403 determines, after sending a promise for the object, that the object cannot or should not be pre-fetched, a "promise cancellation" message for that object is sent to the downstream proxy 401 on the same TCP connection in which the original promise was sent.

To ensure that the parse and pre-fetch service pre-fetches and delivers the correct Web objects to the browser 103, the downstream proxy 401 and the upstream proxy 403 provide for proper handling of cookies that are both sent from the browser 103 and returned from the Web-server 109. The upstream proxy 403, when pre-fetching URLs, provides the same cookies associated with the parsed URL (e.g., HTML or redirection request) HTTP request, assuming the server tail matches the parsed URL's domain name and the HTTP response for the parsed URL did not include a SET COOKIE or SET COOKIE2 field. The upstream proxy 403, when pre-fetching URLs, utilizes the same cookies provided by the parsed URL's HTTP response SET COOKIE or SET COOKIE2 field, assuming the server tail matches the parse URL's domain name. Given these two conditions, the upstream proxy 403 uses the superset of the cookies provided by the browser 103 in the original request and those provided by the server 109 with the parsed object when pre-fetching URLs of that parsed object. The upstream proxy 403 forwards the HTTP cookies used to pre-fetch an object along with that object to the downstream proxy 401.

According to one embodiment of the present invention, two maximum size thresholds are designated for each content type: one threshold for pre-fetching a URL when no HTTP Cookies are included in the pre-fetch request, and another threshold (typically a smaller value) for when cookies are included in the request. Because it is highly probable that requests with HTTP Cookies result in wasted bandwidth, setting a smaller threshold in the "with cookies" option minimizes waste of bandwidth. The upstream proxy 403 uses these thresholds to handle the pre-fetched objects.

An "Entity-Body Too Long" situation occurs when a pre-fetched URL fails to meet the maximum size threshold for the URL's content-type. This can be determined by the upstream proxy 403, under normal conditions, from the URL's HTTP Response CONTENT-LENGTH field, for example. When the URL is too large (i.e., exceeds the threshold), the upstream proxy 403 forwards the HTTP response header with an HppHeaderOnly header field. Thus, the upstream proxy 403 does not forward the HTTP response body to the downstream proxy 401. When the browser 103 requests that URL, the downstream proxy 401 either re-requests the URL in a separate parse and pre-fetch transaction or satisfies the request with a "304 Not Modified" response. The downstream proxy 401 can satisfy the request with a "304" response when the request has a GET IF MODIFIED SINCE field and the pre-fetched HTTP response header has a LAST-MODIFIED field—and the last modified date is at or before the IF-MODIFIED-SINCE date. Also, the downstream proxy 401 adds an HPPBYPASS field to the HTTP request header when re-requesting the URL to ensure that the upstream proxy 403 will proceed with requesting the URL without performing any parsing and pre-fetching of the result.

The downstream proxy 401 is configurable to reject pre-fetched URLs and to retry those URLs with the browser's cookies when the cookies used to pre-fetch the URL are different from the cookies used with the request from the browser 103. The configurable settings include the following: Retry on cookie mismatch, Retry on cookie missing, Retry on restrictive cookie mismatch, and No cookie retries. In the "Retry on cookie mismatch" setting, the downstream proxy 401 retries the URL when the browser's request had cookies and either those cookies were not the same as the cookies used to pre-fetch the URL or the pre-fetch used no cookies. The downstream proxy 401, however, does not retry if the pre-fetch operation used cookies while the browser 103 does not. The "Retry on cookie missing" setting, which is the default setting, provides for retrying the URLs when the browser's request had cookies, and the cookies used on the pre-fetch were not a match or superset of the cookies in the browser's request. With the "Retry on restrictive cookie mismatch" setting, the downstream proxy 401 only retries when the pre-fetch operation employed cookies and the browser 103 did not. Lastly, with the "No cookie retries" setting, the downstream proxy 401 does not retry the cookies under any condition.

Under certain circumstances, the downstream proxy 401 cannot forward a pre-fetched object. One example is where the cookies in the actual browser's request were different from the cookies used to pre-fetch the object. When this occurs, the downstream proxy 401 enters an "optional" HTTP header (denoted "HPPBypass") in the HTTP Request and sends the IP packet on a TCP connection toward the web server 109. Whenever an upstream proxy 403 receives an HTTP request with the HPPBypass header enclosed, the upstream proxy 403 removes the header from the request and sends the IP packet on a TCP connection toward the web server 109. One purpose of the HPPBypass header is to allow the upstream proxy 403 to distinguish between a retry for a pre-fetched URL and a separate request for a pre-fetched URL. In the case of a retry, the upstream proxy 403 would retrieve and deliver the object despite having already delivered that object.

Figure 6A:
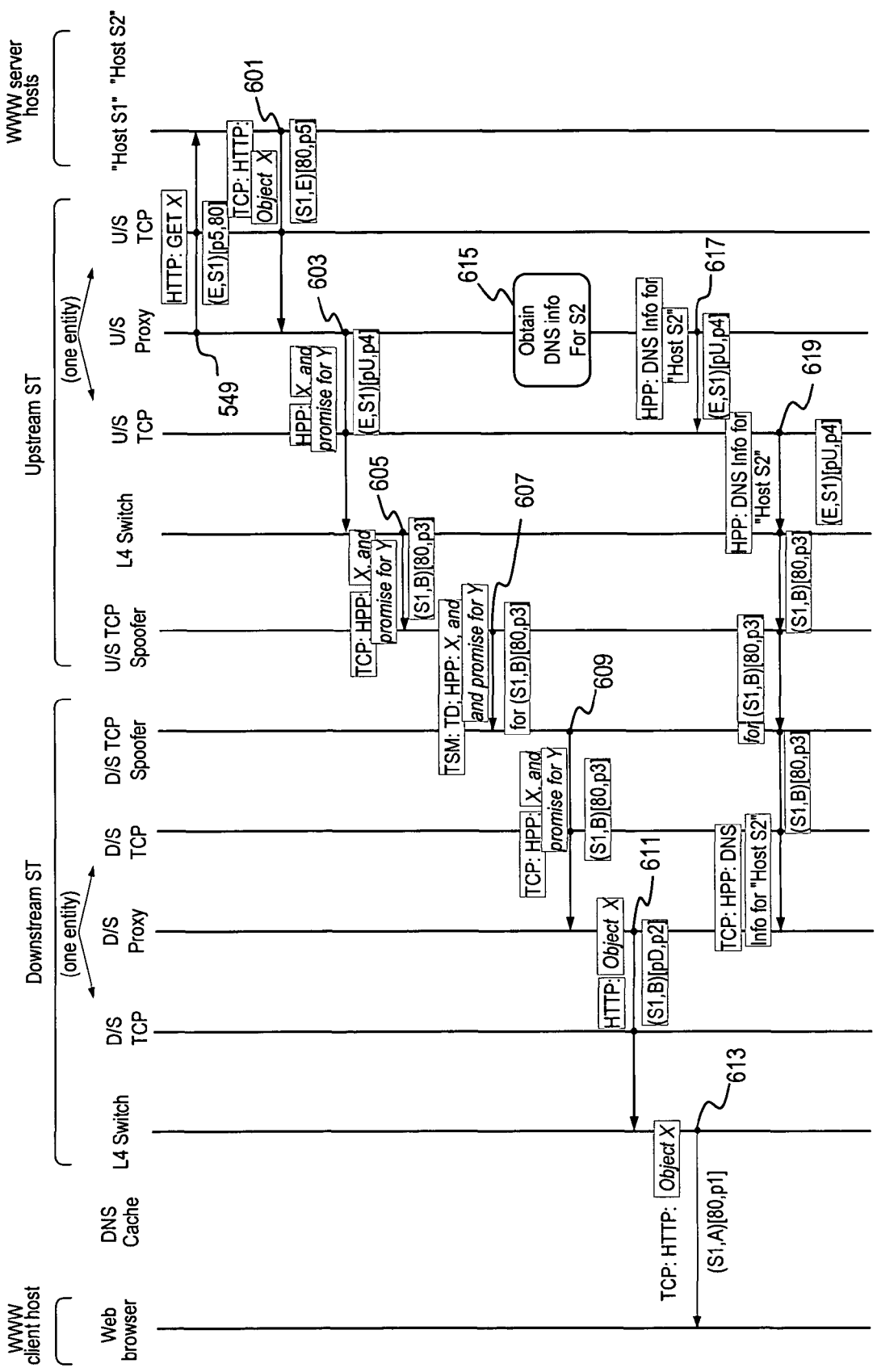
FIGS. 6A and 6B are a ladder diagram of communications from an upstream ST to a downstream ST in support of a parse and pre-fetch process, according to an embodiment of the present invention.
Figure 6B:
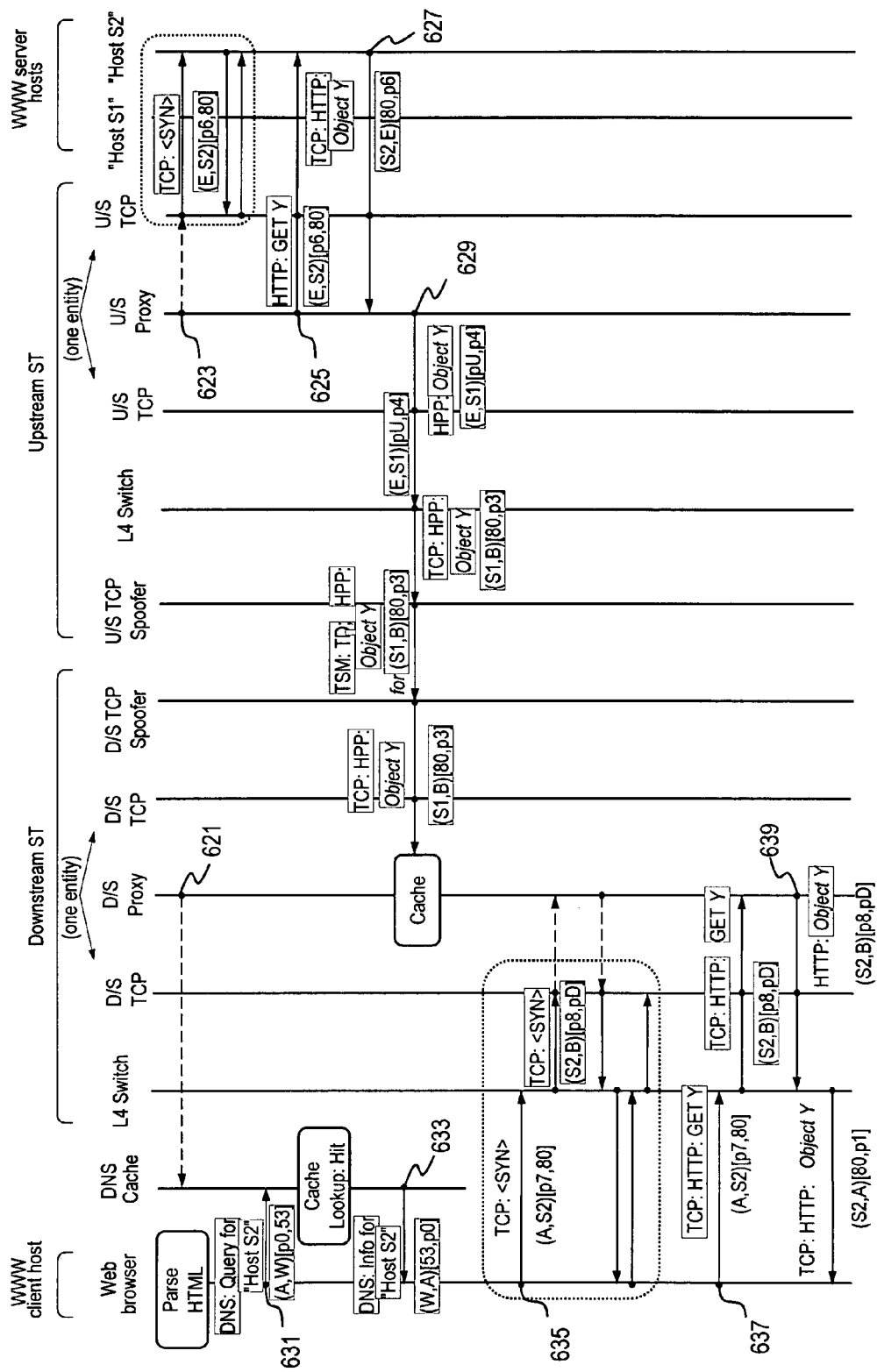

FIGS. 6A and 6B show a ladder diagram of communications from an upstream ST to a downstream ST in support of a parse and pre-fetch process, according to an embodiment of the present invention. Continuing with the example of FIGS. 5A and 5B, once the TCP connection from the upstream proxy 403 to the Web server 109 has been opened, the upstream proxy 403 issues an HTTP GET for the object. In step 601, the Web server 109 returns the requested object to the upstream proxy 403 in response to the GET X message of step 549 (FIGS. 5A and 5B).

By inverting the rule of step 547, the upstream proxy 403 sends this object to the downstream proxy 401, per step 603, using the TCP connection that is already open and corresponds to header information (E,S1)[pU,p4]. The object is prefaced with an "HPPAwait" tag indicating that parse and pre-fetch promises are forthcoming. In one exemplary embodiment, a 6-digit decimal serial number is included with this tag. The purpose of this serial number is to allow the downstream proxy 401 to associate promised objects, when received, with the parsed object which precipitated the pre-fetch. The upstream proxy 403 also parses the HTML of object X to identify objects referenced therein. In this exemplary scenario, the HTML references object Y, an image, which is on a host "Host S2". The upstream proxy 403 appends to the message bearing object X a "promise" indicating to the downstream proxy 401 that the upstream proxy 403 will pre-fetch object Y on host "Host S2". Given the fact that promises are sent, the "HPPAwait" tag appears redundant; however, this tag is needed to address race conditions discussed below.

In step 605, the L4 switch 415 conducts reverse L4 switch processing (corresponding to the reverse of step 525), changing the header information on the IP datagram (bearing the object) from (E,S1)[pU,p4] to (S1,B)[80,p3]. The IP datagram is forwarded to the TCP spoofer 411. The TCP spoofer 411, as in step 607, forwards the object efficiently to the downstream ST 205. In step 609, the TCP spoofer 411 at the downstream ST 205 forwards the object to the downstream proxy 401, on the existing TCP connection corresponding to header information (S1,B)[80,p3].

Next, the downstream proxy 401, per step 611, strips off the promise information added by the upstream proxy 403 and forwards the object towards the client host using the existing TCP connection, corresponding to (S1,B)[pD,p2]. The downstream proxy 401 stores the promise and the serial number for associating later with a pre-fetched object (object Y from "Host S2"). The L4 switch 415 conducts reverse L4 switch processing (corresponding to the reverse of step 507), and provides the object to the client host 101 and Web browser 103, per step 613.

Meanwhile, the upstream proxy 403, having committed to pre-fetch object Y from host "Host S2", determines the IP address corresponding to "Host S2" (per step 615). This may be accomplished by consulting a DNS cache 405 or by querying a DNS server 115. After obtaining the DNS information for "Host S2", the upstream proxy 403 forwards this information, as a parse and pre-fetch message, to the downstream proxy 401, per step 617. This is achieved using the existing TCP connection established earlier between the two parse and pre-fetch proxies. In step 619, the DNS information sent by the upstream proxy 403 passes through the L4 switch 415 and traverses the satellite link via TCP spoofing and arrives at the downstream proxy 401.

Next, in step 621, the downstream proxy 401 extracts the DNS information from the parse and pre-fetch message and stores that information in the ST's DNS cache.

In step 623, the upstream proxy 403 seeks to pre-fetch object Y from "Host S2". Having determined in step 615 that S2 is the IP address for "Host S2", opens a TCP connection with that server to retrieve the object. Ephemeral port number p6, for example, is selected for this purpose. In step 625, the upstream proxy 403 issues an HTTP GET message to "Host S2" for object Y, and "Host S2" returns object Y to the upstream proxy 403 (per step 627).

Thereafter, in step 629, the upstream proxy 403 forwards object Y towards the downstream proxy 401. No promises are appended to this object because the object is an image, and thus, is not parsed for HTTP object references. The object is forwarded through the L4 switch 415, over the air, through TCP spoofing, and is ultimately received by the downstream proxy 401. The serial number sent with the promises in step 603, above, is included with this object. The downstream proxy 401 stores the object in anticipation of a request (an HTTP "GET") for it to arrive shortly. The object is cached in the proxy with the following information as well: the URL by which the object was specified for the pre-fetch and the cookie by which the object was retrieved.

In step 631, object X, namely HTML for a Web page, is parsed by the Web browser 103. In this example, that HTML references one other object, an image (object Y) available from "Host S2". The Web browser 103 issues, to a DNS server 117 having IP address W, a DNS request to resolve the host name "Host S2". This DNS request is routed to the downstream ST 205. In step 633, the ST 205 receives the DNS request and consults its DNS answer cache. The cache lookup operates without regard to whether a DNS entry was obtained by query or from the downstream proxy 401. The DNS information for "Host S2" was loaded into the cache earlier (step 621) by the downstream proxy 401, and consequently a "cache hit" occurs. The ST 205 accordingly returns to the Web browser 103 the requested information, namely that S2 is the IP address for host name "Host S2".

Having the IP address for "Host S2", the browser 103, as in step 633, seeks to open a TCP connection with the second Web server "Host S2". The browser host 101 selects ephemeral port number p7 for this purpose. As before, namely in steps 505-515 of FIG. 5A, the L4 switch 415 causes the TCP connection to be effectively established between the Web browser 103 and the downstream proxy 401. The L4 switch 415 selects ephemeral port number p8 during this operation. From the viewpoint of the browser 103, it establishes a TCP connection with "Host S2".

The Web browser 103 subsequently issues an HTTP GET for object Y, per step 637. The L4 switch 415 causes this GET to be redirected to the downstream proxy 401. The downstream proxy 401 receives, through the L4 switch 415, the HTTP GET for object Y, as in step 639. Since this object is in the cache of the downstream proxy 401, the object is provided to the Web browser 103, via the L4 switch 415.

The operation of the parse and pre-fetch service as described above and in FIGS. 5A and 5B represents a normal operational case. However, a number of special cases can arise; some of these cases are now described. For example, when one of the candidate URLs to be pre-fetched is an HTML document, the upstream proxy 403 parses this candidate URL provided the HTML document is small enough to be pre-fetched. When the HTML is too large to be pre-fetched, the upstream proxy 403 sends an "HppHeaderOnly" response to the downstream proxy 401 and does not attempt to parse the HTML. If the HTML is small enough to be pre-fetched, the following steps occur. First, the upstream proxy 403 attaches an HPPAwait tag to the pre-fetched HTML URL's HTTP response header as the upstream proxy 403 forwards the response header and HTML entity/body (if small enough) to the downstream proxy 401. It is noted that this tag helps in addressing race conditions, as discussed below. The HPPAwait field is added by the upstream proxy 403 as an optional HTTP header in addition to the HPP Promise list (which comes after the parsed object) to cover race conditions. Next, the upstream proxy 403 parses the HTML and appends a promise list with a list of candidate URLs to be pre-fetched from this HTML document. The upstream proxy 403 appends the candidate list of URLs obtained from this HTML document to those obtained from earlier HTML documents. Also, the upstream proxy 403 determines, via standard DNS mechanisms, the IP addresses of hosts referenced in URLs, and forwards the DNS information to the downstream proxy 401. Thereafter, the upstream proxy 403 performs an HTTP GET and forwards the results for the candidate URLs, just as the proxy does candidate URLs from the original Web page. The downstream proxy 401 can accept the responses for these URLs in any order, even intermingled with candidate URLs from the original Web page.

Another special case involves HTTP redirection, which occurs when the HTTP response to an HTTP GET is either "301", "Moved Permanently or 302", or "Moved Temporarily." The upstream proxy 403 treats a redirection as it would an HTML file which references a single "pre-fetchable" URL. The upstream proxy 403 attaches an HPPAwait field to the pre-fetched redirection HTTP response header as it forwards the response header and HTML entity/body (if present and small enough) to the downstream proxy 401. As mentioned, the HPPAwait tag addresses race conditions. The upstream proxy 403 parses the redirection in the HTTP response header and forwards a promise list with a single candidate URL, the redirected URL. Also, the upstream proxy 403 appends this additional candidate URL to those obtained from earlier HTML documents (if any) for this parse and pre-fetch transaction. Further, the upstream proxy 403 performs an HTTP GET and forwards the results for a redirection URL.

Another situation involves a case in which a pre-fetched URL fails to meet the maximum size threshold for the URL's content-type. This can be determined by the upstream proxy 403, under normal conditions, from the URL's HTTP Response CONTENT-LENGTH field. When the URL is too large, the upstream proxy 403 forwards the HTTP response header with an "HppHeaderOnly" header field. As a result, the upstream proxy 403 will not be forwarding the HTTP response body to the downstream proxy 401. When the browser 103 requests that URL, the downstream proxy 401 either has to re-request the URL in a separate parse and pre-fetch transaction or satisfy the request with a "304 Not Modified" response. The downstream proxy 401 can satisfy the request with a 304 response when the request has a GET 1F MODIFIED SINCE field and the pre-fetched HTTP response header has a LAST-MODIFIED field and the last modified date is at or before the IF-MODIFIED-SINCE date. The downstream proxy 401 adds an HPPBYPASS field to the HTTP request header when re-requesting the URL to ensure that the upstream proxy 403 will request the URL without performing any parsing and pre-fetching of the result.

In another special case, the HTTP CONTENT-LENGTH field may be missing from an HTML page, as this field is an optional field. The CONTENT-LENGTH field indicates the length of an HTTP response's entity body. Although the use of this field for HTTP is optional, the field is needed for pre-fetched URLs and HTML URLs preceding pre-fetch URLs. When the content length field is missing from an HTML page that would ordinarily start a pre-fetch operation, the upstream proxy 403 sends the HTML page downstream using, for example, the HTTP 1.1 chunked transfer encoding, but where the Transfer-Encoding field's transfer coding takes the value "hppchunked". The downstream proxy 401 removes the chunked transfer encoding and sends the HTML to the browser 103 and closes the connection to the browser 103 when the transfer is complete. Furthermore, when the CONTENT-LENGTH field is missing from a URL that is being pre-fetched, the upstream proxy 403 reads in the URL's entity body up to a configurable size, and, depending on the size of the entity body, either forwards the HTTP response header with a CONTENT-LENGTH field when the entire Entity Body fits within the configurable size; or forwards the HTTP response header with an HppHeaderOnly header when the Entity Body does not fit within the configurable size. Thus, when the browser 103 requests that URL, the downstream proxy 401 will either re-request the URL in a separate parse and pre-fetch transaction or satisfy the request with a 304 Not Modified response just as it would for a URL which was too long to be pre-fetched.

As noted previously, a number or race conditions between Requests and Promises need to be considered: (1) Request Before Promise, After HppAwait; (2) Request Before Promise; and (3) Request After Promise, Before Pre-fetched Data. The "Request Before Promise, After HppAwait" special case takes place when the browser 103 requests a URL and the downstream proxy 401 is in a state between receiving a URL with an HppAwait header field and the promise list for that URL. This frequently occurs on fast PCs when the HppAwait is for an HTML file and the browser 103 quickly initiates the retrieval of dependent URLs even before the entire HTML has been received. The processing associated with this special case is intended to reduce unnecessary HTTP requests being sent across the satellite link, which reduces loading both on the satellite link and on the upstream proxy 403.

The downstream proxy 401 holds the HTTP request until one of the following events occurs. One condition involves the promise list having been received and all of the promises having been put in the cache. When this occurs and the URL is one of those promised the unnecessary HTTP request is not sent. The downstream proxy 401 can also hold the HTTP request until a configurable timeout (e.g., 150 ms) occurs. When this occurs, the processing occurs according to the Request-Before-Promise special case. The HTTP request is also held unless the TCP connection goes down, such that the processing occurs as if the TCP connection is down momentarily before the downstream proxy's cache lookup occurring.

The Request-Before-Promise special case involves a situation when the browser 103 requests a URL that is going to be promised by the upstream proxy 403 before the promise reaches the downstream proxy 401. Under this scenario, the downstream proxy 401 sends an ordinary request for the URL to the upstream proxy 403. The upstream proxy 403 receives the URL request, looks up the URL in the proxy's HppHistory buffer, finds that URL in the history in an un-expired state, and sends an HTTP response header with an HppPromised response. In other words, the upstream proxy 403 keeps track of the URLs that are being processing for parse and pre-fetch, realizing that it has already issued a promise for the URL requested. The upstream proxy 403 sends the promise to the downstream proxy 401. In addition, the upstream proxy 403 sends the promised URL data. These steps of the upstream proxy 403 are in a race condition.

When the step of looking up the HppHistory occurs before the upstream proxy 403 sends the promised URL data, the downstream proxy 401 waits for the arrival of the promised URL. When the upstream proxy 403 sends the promise to the downstream proxy 401 before the other steps, the downstream proxy 401 waits for the arrival of the promised URL data. The parse and pre-fetch transaction is not aborted.

After the upstream proxy 403 sends the promised URL data, the downstream proxy 401 first checks whether the HTTP response header from the step of looking up the HppHistory has arrived; if the response has not arrived, the downstream proxy 401 prepares to silently ignore the HTTP response header (resulting from the look-up) when it comes. The downstream proxy 401 then handles the promised URL data as if it were the normal case. It may, if the data provided is an HppHeaderOnly, have to re-request the URL in a separate HTTP request bearing the HPPBypass header.

The Request After Promise special case occurs when the browser 103 requests a URL for which the downstream proxy 401 has already received a promise. In this situation, the downstream proxy 401 waits for the arrival of the promised URL. When the data for the promised URL arrives, the downstream proxy 401 handles the data as in the normal case. However, the downstream proxy 401 may, if the data provided is an HppHeaderOnly, have to re-request the URL using the optional HPPBypass header in an HTTP request.

The HTTP parse and pre-fetch operation can encounter other conditions, such as failures and errors. For example, a "Failed Pre-Fetch" occurs when a valid HTTP response for a candidate URL could not be obtained. This situation can stem from a failure in the DNS lookup, whereby the domain name of the server could not be determined. A connection failure can also result in a failed pre-fetch operation, in which a connection to the server could not be obtained. In these scenarios, the upstream proxy 403 creates an appropriate HTTP error response header (e.g., perhaps with an entity body) for the downstream proxy 401, which then forwards the response to the browser 103 that interprets the header.

A Failed Pre-fetch condition can also result if the HTTP protocol version is not compatible; for example, the web server failed to respond within a reasonable timeout or responded with a message other than a valid HTTP response header (e.g., older, incompatible HTTP version—HTTP 0.9). The pre-fetch operation can also fail if the wrong number of entity body bytes are received; that is, the web server did not send the number of bytes specified in the CONTENT-LENGTH field, or the server did not send a valid HTTP response. A Failed Pre-fetch condition can also result if the HTTP protocol version is not compatible; for example, the web server failed to respond within a reasonable timeout or responded with a message other than a valid HTTP response header (e.g., older, incompatible HTTP version—HTTP 0.9). In these cases, the upstream proxy 403 creates an appropriate HTTP response header with an HppHeaderOnly field. The downstream proxy 401 then handles this case as if the response was too long and performs a separate parse and pre-fetch transaction with the HPPBypass header.

The parse and pre-fetch operation can also fail if the downstream proxy 401 cannot forward a pre-fetched object. One example is a situation in which the cookies in the actual browser's request were different from the cookies used to pre-fetch the object. When this occurs, the downstream proxy 401 handles the request as if it received a response header with an HppHeaderOnly field and performs a separate parse and pre-fetch transaction with the HPPBypass header.

In some of the special operational cases as explained above, the performance benefits of the parse and pre-fetch process cannot be realized; however, the transparency of the operation permits HTTP communication to be conducted. Under normal operation, the parse and pre-fetch process advantageously reduces response time for browser applications, while efficiently utilizing precious bandwidth.

Figure 7:
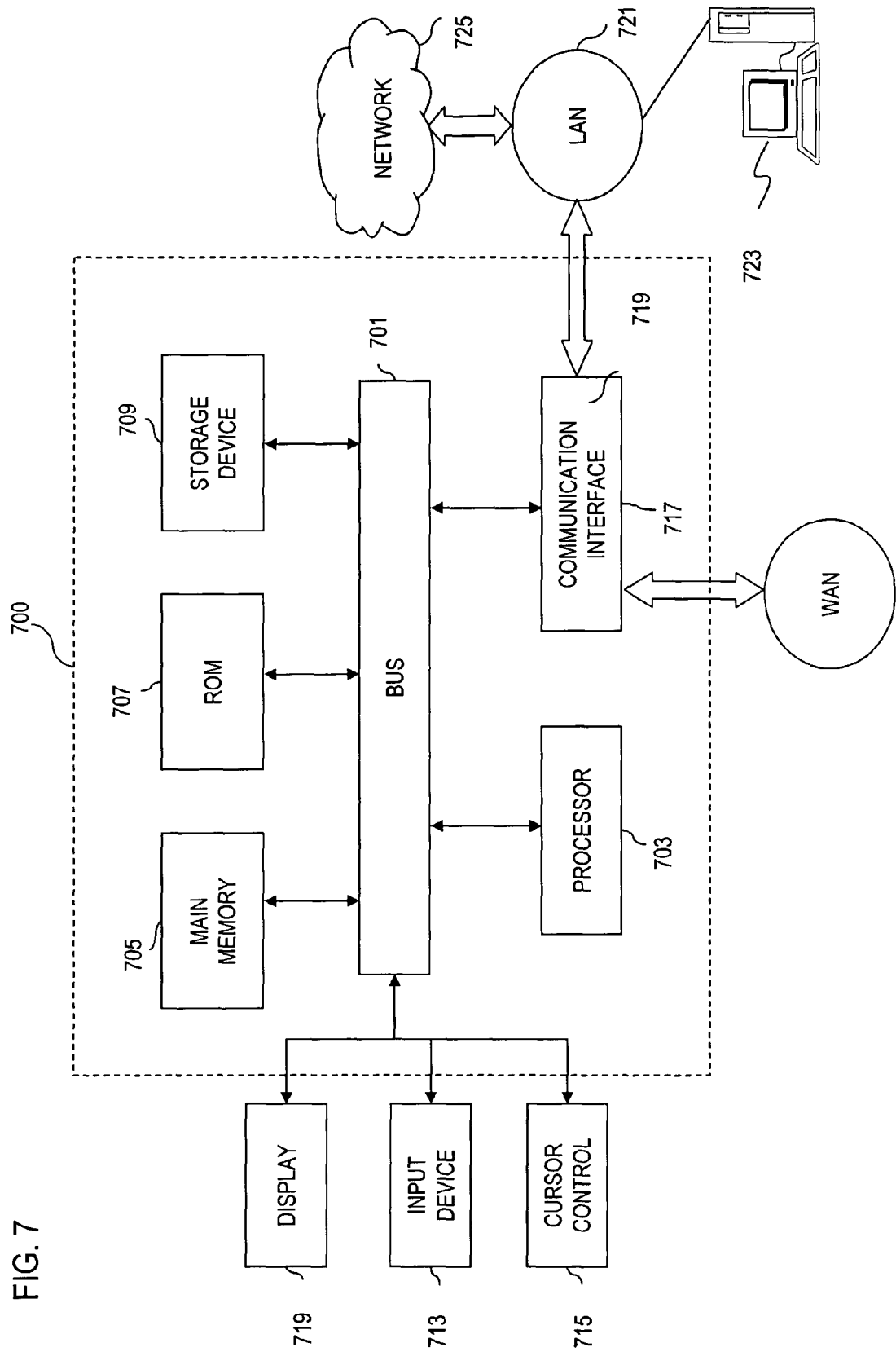
FIG. 7 is a diagram of a computer system that can implement a parse and pre-fetch process, according to an embodiment of the present invention.
Figure 8:
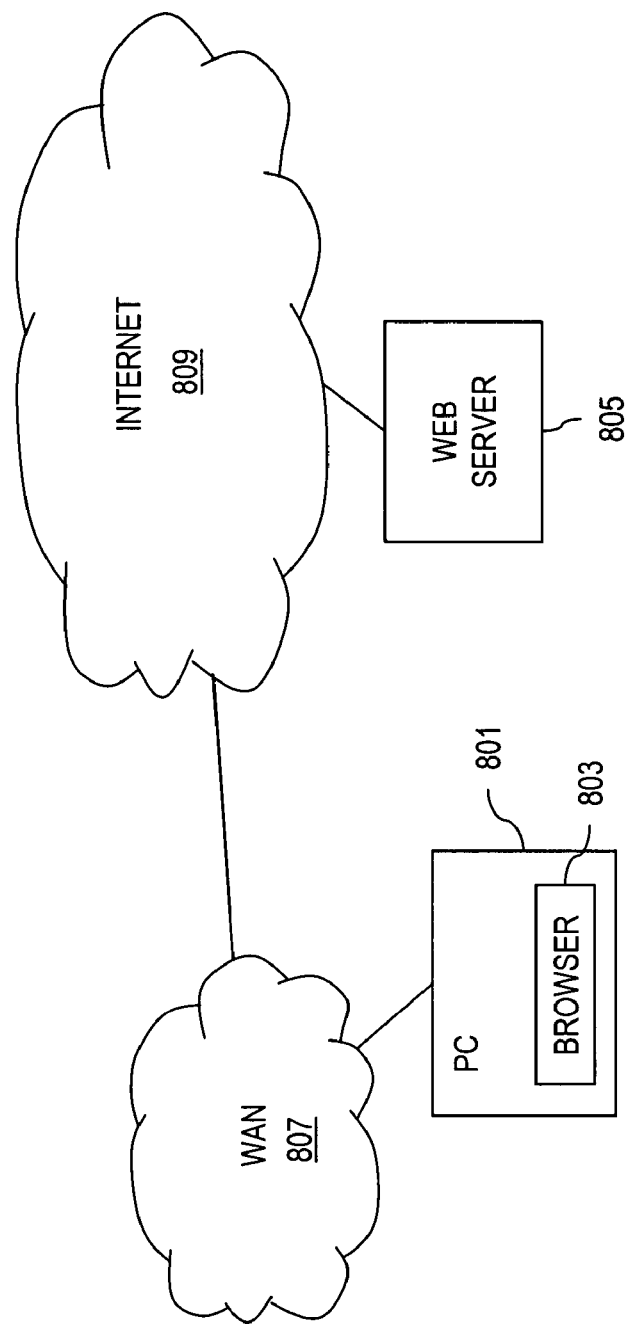
FIG. 8 is a diagram of a conventional communication system for providing retrieval of web content by a personal computer (PC).

FIG. 7 illustrates a computer system 700 upon which an embodiment according to the present invention can be implemented. The computer system 700 includes a bus 701 or other communication mechanism for communicating information and a processor 703 coupled to the bus 701 for processing information. The computer system 700 also includes main memory 705, such as a random access memory (RAM) or other dynamic storage device, coupled to the bus 701 for storing information and instructions to be executed by the processor 703. Main memory 705 can also be used for storing temporary variables or other intermediate information during execution of instructions by the processor 703. The computer system 700 may further include a read only memory (ROM) 707 or other static storage device coupled to the bus 701 for storing static information and instructions for the processor 703. A storage device 709, such as a magnetic disk or optical disk, is coupled to the bus 701 for persistently storing information and instructions.

The computer system 700 may be coupled via the bus 701 to a display 711, such as a cathode ray tube (CRT), liquid crystal display, active matrix display, or plasma display, for displaying information to a computer user. An input device 713, such as a keyboard including alphanumeric and other keys, is coupled to the bus 701 for communicating information and command selections to the processor 703. Another type of user input device is a cursor control 715, such as a mouse, a trackball, or cursor direction keys, for communicating direction information and command selections to the processor 703 and for controlling cursor movement on the display 711.

According to one embodiment of the invention, the modules of the system of FIG. 4 is implemented by the computer system 700 in response to the processor 703 executing an arrangement of instructions contained in main memory 705. Such instructions can be read into main memory 705 from another computer-readable medium, such as the storage device 709. Execution of the arrangement of instructions contained in main memory 705 causes the processor 703 to perform the process steps described herein. One or more processors in a multi-processing arrangement may also be employed to execute the instructions contained in main memory 705. In alternative embodiments, hard-wired circuitry may be used in place of or in combination with software instructions to implement the embodiment of the present invention. Thus, embodiments of the present invention are not limited to any specific combination of hardware circuitry and software.

The computer system 700 also includes a communication interface 717 coupled to bus 701. The communication interface 717 provides a two-way data communication coupling to a network link 719 connected to a local network 721. For example, the communication interface 717 may be a digital subscriber line (DSL) card or modem, an integrated services digital network (ISDN) card, a cable modem, a telephone modem, or any other communication interface to provide a data communication connection to a corresponding type of communication line. As another example, communication interface 717 may be a local area network (LAN) card (e.g. for Ethernet™ or an Asynchronous Transfer Model (ATM) network) to provide a data communication connection to a compatible LAN. Wireless links can also be implemented. In any such implementation, communication interface 717 sends and receives electrical, electromagnetic, or optical signals that carry digital data streams representing various types of information. Further, the communication interface 717 can include peripheral interface devices, such as a Universal Serial Bus (USB) interface, a PCMCIA (Personal Computer Memory Card International Association) interface, etc. Although a single communication interface 717 is depicted in FIG. 7, multiple communication interfaces can also be employed.

The network link 719 typically provides data communication through one or more networks to other data devices. For example, the network link 719 may provide a connection through local network 721 to a host computer 723, which has connectivity to a network 725 (e.g. a wide area network (WAN) or the global packet data communication network now commonly referred to as the "Internet") or to data equipment operated by a service provider. The local network 721 and the network 725 both use electrical, electromagnetic, or optical signals to convey information and instructions. The signals through the various networks and the signals on the network link 719 and through the communication interface 717, which communicate digital data with the computer system 700, are exemplary forms of carrier waves bearing the information and instructions.

The computer system 700 can send messages and receive data, including program code, through the network(s), the network link 719, and the communication interface 717. In the Internet example, a server (not shown) might transmit requested code belonging to an application program for implementing an embodiment of the present invention through the network 725, the local network 721 and the communication interface 717. The processor 703 may execute the transmitted code while being received and/or store the code in the storage device 709, or other non-volatile storage for later execution. In this manner, the computer system 700 may obtain application code in the form of a carrier wave.

The term "computer-readable medium" as used herein refers to any medium that participates in providing instructions to the processor 703 for execution. Such a medium may take many forms, including but not limited to non-volatile media, volatile media, and transmission media. Non-volatile media include, for example, optical or magnetic disks, such as the storage device 709. Volatile media include dynamic memory, such as main memory 705. Transmission media include coaxial cables, copper wire and fiber optics, including the wires that comprise the bus 701. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Accordingly, an approach is provided for transparently parsing and pre-fetching web content over a high latency communication system, such as a satellite network. A downstream proxy, which can be resident on a satellite terminal (ST), communicates with a web browser (or other client applications) according to a HyperText Transfer Protocol (HTTP). The downstream proxy, in an exemplary embodiment, employs the "optional" fields in the HTTP request header to designate that the parse and pre-fetch service is enabled. An upstream proxy, if present, intercepts the request and parses the request and pre-fetches the content from the web server. The downstream proxy operates independently and transparently with respect to the upstream proxy. In one embodiment, the downstream proxy can operate with multiple upstream proxies, to different routes, simultaneously, without hierarchical arrangement of these upstream proxies. The downstream proxy can obtain pre-fetched content (as well as DNS information) provided by upstream proxies without the need for a priori connection setup that is specific to support the parse and pre-fetched service. According to one embodiment of the present invention, the downstream and upstream proxies are located within the same routing device (e.g., ST), and can be simultaneously served by a Layer 4 switch. The above arrangement advantageously reduces response time, while conserving system bandwidth.

While the present invention has been described in connection with a number of embodiments and implementations, the present invention is not so limited but covers various obvious modifications and equivalent arrangements, which fall within the purview of the appended claims.

What is claimed is:

1. A method for retrieving content from a web server that is upstream over a communication network from a browser application and a downstream proxy, the method comprising:
   receiving a request, at the downstream proxy, from the browser application for the content in the web server;
   modifying the request to specify support of a parse and pre-fetch function, the request being modified in a manner so as to permit handling of the modified request directly by the web server in absence of an upstream-proxy, upstream over the communication network for handling the modified request for the web server;
   forwarding the modified request over a communication link of the communication network to the web server, wherein the upstream proxy, if present, intercepts the modified request and, in response to the specified support of the parse and pre-fetch function, executes the parse and pre-fetch function, whereby the upstream proxy pre-fetches at least a portion of the content from the web server; and
   selectively receiving the content from the upstream proxy over the communication link and forwarding the content to the browser application, and
   wherein, pursuant to the parse and pre-fetch function, the upstream proxy retrieves an initial portion of the content from the web server, and parses the retrieved initial content, and wherein the pre-fetched portion of the content is based at least in part on the parsed initial content.

2. A method according to claim 1, wherein the request conforms with a Hypertext Transfer Protocol (HTTP), the method further comprising:
   inserting treatment information in an optional field of the request.

3. A method according to claim 1, wherein the step of modifying the request is transparent to the browser application.

4. A method according to claim 1, further comprising:
   receiving a second request from a second browser application;
   modifying the second request in a same manner as with the request; and
   forwarding the modified second request over a second communication link of the communication network to a second upstream proxy,
   wherein said receiving, modifying and forwarding steps with respect to the second request are concurrently executed with the steps of receiving, modifying and forwarding the request.

5. A method according to claim 1, further comprising:
   communicating with a switching module to receive the request, wherein the switching module includes Open Systems Interconnection (OSI) Layer 4 functionality to redirect the request from a network interface.

6. A method according to claim 1, wherein the content conforms with a markup language that includes Hypertext Markup Language (HTML).

7. A method according to claim 1, wherein the communication network comprises a Very Small Aperture Terminal (VSAT) satellite network, and the upstream proxy resides in an upstream VSAT in communication with the web server.

8. A non-transitory computer-readable storage medium bearing instructions for retrieving content from a web server that is upstream over a communication network, said instructions being arranged, upon execution, to cause one or more processors to perform the method of claim 1.

9. A network apparatus for supporting retrieval of content from a web server that is upstream over a communication network from a browser application and the network apparatus, the apparatus comprising:
   an interface configured to receive a request from the browser application for the content in the web server;
   a proxy configured to modify the request to specify support of a parse and pre-fetch function, the request being modified in a manner so as to permit handling of the modified request directly by the web server in absence of an upstream proxy, upstream over the communications network from the network apparatus for handling the modified request for the web server; and
   an interface configured to forward the modified request over a communication link of the communication network to the web server, and
   wherein the upstream proxy, if present, intercepts the modified request and, in response to the specified support of the parse and pre-fetch function, executes the parse and pre-fetch function, whereby the upstream proxy pre-fetches at least a portion of the content from the web server, and
   wherein the proxy is further configured to receive the content from the upstream proxy over the communication link and to forward the content to the browser application, and
   wherein, pursuant to the parse and pre-fetch function, the upstream proxy retrieves an initial portion of the content from the web server, and parses the retrieved initial content, and wherein the pre-fetched portion of the content is based at least in part on the parsed initial content.

10. A network apparatus according to claim 9, wherein the request conforms with a Hypertext Transfer Protocol (HTTP), the downstream proxy inserting treatment information in an optional field of the request.

11. A network apparatus according to claim 9, wherein the request is transparent to the browser application.

12. A network apparatus according to claim 9, wherein the proxy concurrently communicates with a plurality of upstream proxies including the upstream proxy.

13. A network apparatus according to claim 9, further comprising:
   a switching module coupled to the interface, the switching module including Open Systems Interconnection (OSI) Layer 4 functionality to redirect the request from the interface to the downstream proxy.

14. A network apparatus according to claim 9, wherein the content conforms with a markup language that includes Hypertext Markup Language (HTML).

15. A network apparatus according to claim 9, wherein the communication network comprises a Very Small Aperture Terminal (VSAT) satellite network, and the upstream proxy resides in an upstream VSAT in communication with the web server.

16. A network apparatus according to claim 9, further comprising:
   a downstream proxy, downstream over the communication network from the web server and the upstream proxy, configured to support pre-fetching of content from a second web server local to the network apparatus.

17. A method for retrieving content from a web server that is upstream over a communication network from a browser application and a downstream proxy, the method comprising:
   intercepting a request for the content, wherein the request has been modified by the downstream proxy to specify support of a parse and pre-fetch function, in a manner so as to permit handling of the modified request directly by the web server in absence of an upstream proxy, upstream over the communication network for handling the modified request for the web server, and forwarded by the downstream proxy over a communication link of the communication network to the web server;
   pre-fetching, in response to the specified support of the parse and pre-fetch function, at least a portion of the content from the web server pursuant to the parse and pre-fetch function; and
   forwarding the content to the downstream proxy over the communication link, and
   wherein, pursuant to the parse and pre-fetch function, the method further comprising retrieving an initial portion of the content from the web server, and parsing the retrieved initial content, wherein the pre-fetched portion of the content is based at least in part on the parsed initial content.

18. A method according to claim 17, wherein the request conforms with a Hypertext Transfer Protocol (HTTP), and the method further comprising:
   inserting treatment information in an optional field of the request.

19. A method according to claim 17, wherein the step of intercepting the request is transparent to the browser application.

20. A method according to claim 17, wherein the content conforms with a markup language that includes Hypertext Markup Language (HTML).

21. A method according to claim 17, wherein the communication network comprises a Very Small Aperture Terminal (VSAT) satellite network, and the downstream proxy resides in an VSAT in communication with the browser application.

22. A non-transitory computer-readable storage medium bearing instructions for retrieving content from a web server that is upstream over a communication network from a browser application, said instructions being arranged, upon execution, to cause one or more processors to perform the method of claim 17.

23. A network apparatus for retrieving content from a web server, wherein the network apparatus and the web server are upstream over a communication network from a browser application and a downstream proxy, the network apparatus comprising:
   an interface configured to intercept a request for the content, wherein the request has been modified by the downstream proxy to specify support of a parse and pre-fetch function and forwarded by the downstream proxy over a communication link of the communication network to the web server; and
   an upstream proxy configured to pre-fetch, in response to the specified support of the parse and pre-fetch function, at least a portion of the content from the web server pursuant to the parse and pre-fetch function, and to forward the content to the downstream proxy over the communication link, and
   wherein, pursuant to the parse and pre-fetch function, the upstream proxy retrieves an initial portion of the content from the web server, and parses the retrieved initial content, and wherein the pre-fetched portion of the content is based at least in part on the parsed initial content.

24. A network apparatus according to claim 23, wherein the request conforms with a Hypertext Transfer Protocol (HTTP), and the downstream proxy inserts treatment information in an optional field of the request.

25. A network apparatus according to claim 23, wherein the pre-fetching of at least a portion of the content is transparent to the browser application.

26. A network apparatus according to claim 23, wherein the content conforms with a markup language that includes Hypertext Markup Language (HTML).

27. A network apparatus according to claim 23, wherein the communication network comprises a Very Small Aperture Terminal (VSAT) satellite network.

28. A system for supporting retrieval of content from a web server that is upstream over a meshed communication network from a browser application and a downstream proxy, the system comprising:
   a downstream server, downstream over the meshed communication network from the web server, configured to receive a request for the content from a browser application, the downstream server including the downstream proxy, wherein the downstream proxy is configured (1) to modify the request to specify support of a parse and pre-fetch function, the request being modified in a manner so as to permit handling of the modified request directly by the web server in absence of an upstream proxy, upstream over the meshed communications network from the downstream server for handling the modified request for the web server, and (2) to forward the modified request over a communication link of the meshed communication network to the web server; and
   an upstream server, upstream over the meshed communication network from the downstream server, configured to intercept the modified request, the upstream server including the upstream proxy configured to pre-fetch, in response to the specified support of the parse and pre-fetch function, at least a portion of the content from the web server pursuant to the parse and pre-fetch function, and to forward the content to the downstream server over the communication link, and
   wherein, pursuant to the parse and pre-fetch function, the upstream proxy retrieves an initial portion of the content from the web server, and parses the retrieved initial content, and wherein the pre-fetched portion of the content is based at least in part on the parsed initial content.

29. A system according to claim 28, further comprising:
a plurality of upstream proxies in simultaneous communication with the downstream proxy of the downstream server, each for supporting the parse and pre-fetch function with respect to content from a respective plurality of web servers.

30. A system according to claim 28, wherein the downstream server includes a switching module having Open Systems Interconnection (OSI) Layer 4 functionality to redirect the request from a network interface to the downstream proxy.

31. A network device for retrieving content from a web server that is upstream over a communication network from a browser application and a downstream proxy, the device comprising:
means for receiving a request, at the downstream proxy, from the browser application for the content in the web server;
means for modifying the request to specify support of a parse and pre-fetch function, the request being modified in a manner so as to permit handling of the modified request directly by the web server in absence of an upstream proxy, upstream over the communications network from the network device for handling the modified request for the web server;
means for forwarding the modified request over a communication link of the communications network to the web server, wherein the upstream proxy, if present, intercepts the modified request and, in response to the specified support of the parse and pre-fetch function, executes the parse and pre-fetch function, whereby the upstream proxy pre-fetches the content from the web server; and
means for selectively receiving the content from the upstream proxy over the communication link and forwarding the content to the browser application, and
wherein, pursuant to the parse and pre-fetch function, the upstream proxy retrieves an initial portion of the content from the web server, and parses the retrieved initial content, and wherein the pre-fetched portion of the content is based at least in part on the parsed initial content.

* * * * *